United States Patent
Tolman et al.

(10) Patent No.: US 10,741,091 B2
(45) Date of Patent: Aug. 11, 2020

(54) METHODS AND SYSTEMS FOR MITIGATING THE EFFECTS OF INTERMITTENT NETWORK CONNECTIVITY IN EDUCATIONAL SETTINGS

(71) Applicant: ThinkCERCA.com, Inc., Chicago, IL (US)

(72) Inventors: Joshua Tolman, Elmhurst, IL (US); Jerry Busser, Shaker Heights, OH (US)

(73) Assignee: ThinkCERCA.com, Inc., Chicago, IL (US)

( * ) Notice: Subject to any disclaimer, the term of this patent is extended or adjusted under 35 U.S.C. 154(b) by 605 days.

(21) Appl. No.: 15/424,562

(22) Filed: Feb. 3, 2017

(65) Prior Publication Data
US 2017/0230479 A1    Aug. 10, 2017

Related U.S. Application Data

(60) Provisional application No. 62/292,012, filed on Feb. 5, 2016, provisional application No. 62/292,005, filed on Feb. 5, 2016.

(51) Int. Cl.
| | | |
|---|---|---|
| H04L 29/06 | (2006.01) |
| H04L 29/08 | (2006.01) |
| G09B 7/02 | (2006.01) |
| G06F 3/0484 | (2013.01) |
| G09B 7/08 | (2006.01) |
| G09B 5/08 | (2006.01) |
| G09B 5/06 | (2006.01) |

(Continued)

(52) U.S. Cl.
CPC ........... *G09B 7/02* (2013.01); *G06F 3/04847* (2013.01); *G06F 40/169* (2020.01); *G09B 5/02* (2013.01); *G09B 5/06* (2013.01); *G09B 5/08* (2013.01); *G09B 7/06* (2013.01); *G09B 7/08* (2013.01); *H04L 67/02* (2013.01); *H04L 67/06* (2013.01); *H04L 67/327* (2013.01); *H04L 67/42* (2013.01)

(58) Field of Classification Search
CPC ..................................................... H04L 67/02
USPC ........................................................ 709/203
See application file for complete search history.

(56) References Cited

U.S. PATENT DOCUMENTS

| | | |
|---|---|---|
| 5,886,697 A | 3/1999 | Naughton |
| 7,717,712 B2 | 5/2010 | Brun et al. |

(Continued)

*Primary Examiner* — Sm A Rahman
*Assistant Examiner* — Emad Siddiqi
(74) *Attorney, Agent, or Firm* — Invention Mine LLC

(57) ABSTRACT

Disclosed herein are methods and systems for mitigating the effects of intermittent network connectivity in educational settings. A student assignment is presented via a client-side user interface of an educational platform. The client-side user interface is initially operated in a read/write mode. Student input is received via the client-side user interface in connection with the student assignment, and is responsively locally stored. A remote-save-triggering event is detected, and a remote-save method is responsively executed. The remote-save method attempts to save the locally stored student input to a remote server. If the remote-save method returns a remote-save-success promise, the client-side user interface is continued to be operated in the read/write mode. If the remote-save method returns a remote-save-failure promise, the client-side user interface is transitioned to being operated in a read-only mode.

18 Claims, 27 Drawing Sheets

(51) Int. Cl.
    *G06F 40/169*     (2020.01)
    *G09B 5/02*     (2006.01)
    *G09B 7/06*     (2006.01)

(56) References Cited

U.S. PATENT DOCUMENTS

| | | |
|---|---|---|
| 8,714,986 B2 | 5/2014 | Dodelson |
| 9,966,065 B2 | 5/2018 | Gruber |
| 2002/0192631 A1 | 12/2002 | Weir et al. |
| 2003/0036040 A1 | 2/2003 | Kurzweil et al. |
| 2006/0204949 A1 | 9/2006 | Fok et al. |
| 2008/0229185 A1 | 9/2008 | Lynch |
| 2011/0098110 A1 | 4/2011 | Howell |
| 2013/0275164 A1 | 10/2013 | Gruber |
| 2014/0089315 A1 | 3/2014 | Krause |
| 2014/0089316 A1 | 3/2014 | Krause |
| 2014/0122991 A1 | 5/2014 | Achillopoulos |
| 2014/0255889 A1 | 9/2014 | Grimes |
| 2014/0272847 A1 | 9/2014 | Grimes |
| 2014/0272894 A1* | 9/2014 | Grimes ............... G09B 5/08 434/350 |
| 2014/0278895 A1 | 9/2014 | Grimes |
| 2015/0206446 A1 | 7/2015 | Gupta |
| 2015/0261859 A1 | 9/2015 | Isensee |
| 2015/0348551 A1 | 12/2015 | Gruber et al. |
| 2016/0092095 A1 | 3/2016 | Fibaek |
| 2017/0185306 A1* | 6/2017 | Eisler ............... G06F 11/2082 |
| 2017/0230479 A1 | 8/2017 | Tolman |

\* cited by examiner

[Unit:Poetry] {Assignment:"The Roller Coaster" (Course:English 101)} ← 502

← 504

← 506

| ① Connect | ② Read | ③ Engage with the Text | ④ Summarize | ⑤ Build an Argument | ⑥ Compose | NEXT> |

☆ Overview 508 510

Ⓑ Vocabulary

Ⓒ Text

Ⓓ Rubric

Ⓔ Highlights

Ⓕ Your Work

☆ Topic Overview 516

This is an overview description of the source-material selection that is the subject of this assignment. 518

512

Central Question: How does the author of the source-material selection communicate emotions using elements of repetition and sound?

☆ Step 1: Connect 520

Task: Describe a personal experience in which you experienced both positive and negative emotions.

524

[Enter text.]

[Unit:Poetry] {Assignment:"The Roller Coaster" (Course:English 101)}

① Connect  ② Read  ③ Engage with the Text  ④ Summarize  ⑤ Build an Argument  ⑥ Compose  NEXT>

502 → 504 506

Ⓐ Overview
Ⓑ Vocabulary
Ⓒ Text
Ⓓ Rubric
Ⓔ Highlights
Ⓕ Your Work 508 510

Topic Vocabulary  602 word1: (part of speech 1) definition1
word2: (part of speech 2) definition2
word3: (part of speech 3) definition3
word4: (part of speech 4) definition4
word5: (part of speech 5) definition5

512  604

Central Question: How does the author of the source-material selection communicate emotions using elements of repetition and sound?

Step 1: Connect  520

Task: Describe a time that you used positive thinking or looking forward to something to help you get through a difficult situation.

524

[Enter text.]

[Unit:Poetry] {Assignment:"The Roller Coaster" (Course:English 101)} ← 502

← 504  506

① Connect  ② Read  ③ Engage with the Text  ④ Summarize  ⑤ Build an Argument  ⑥ Compose  NEXT>

Source-Material Text  702

708

The Roller Coaster
By Example Author  704

[Line 1 of Source-Material Selection]
[Line 2 of Source-Material Selection]
[Line 3 of Source-Material Selection]
[Line 4 of Source-Material Selection]
[Line 5 of Source-Material Selection]

🔊 ~ 706
▲ ▼ ▼ ■ ▲

512

Step 1: Connect  520

Task: Describe a time that you used positive thinking or looking forward to something to help you get through a difficult situation.

524

[Enter text.]

522  526

514

A Overview
B Vocabulary
D Text
E Rubric
E Highlights
F Your Work 508  510

Central Question:  How does the author of the source-material selection communicate emotions using elements of repetition and sound?

[Unit:Poetry] {Assignment:"The Roller Coaster" (Course:English 101)} → 504 506 → 502

① Connect | ② Read | ③ Engage with the Text | ④ Summarize | ⑤ Build an Argument | ⑥ Compose | NEXT>

Ⓐ Overview
Ⓑ Vocabulary
Ⓒ Text
Ⓓ Rubric
Ⓔ Highlights
Ⓕ Your Work 508 510

Rubric 802
[Evaluation Criteria]
VIEW FULL RUBRIC 808
804
512

Step 1: Connect 520
Task: Describe a time that you used positive thinking or looking forward to something to help you get through a difficult situation.

524
[Enter text.]
522
526
514

Central Question: How does the author of the source-material selection communicate emotions using elements of repetition and sound?

[Unit:Poetry] {Assignment:"The Roller Coaster" (Course:English 101)}

① Connect  ② Read  ③ Engage with the Text  ④ Summarize  ⑤ Build an Argument  ⑥ Compose  NEXT>

502  504  506

A. Overview
B. Vocabulary
C. Text
D. Rubric
E. Highlights
F. Your Work 508  510

Highlights  902

Highlight1 Color/Category
*Highlight1 word1*
[Highlight1-specific notes]

Highlight2 Color/Category
*Highlight2 word2*
[Highlight2-specific notes]

Highlight3 Color/Category
*Highlight3 word3*
[Highlight3-specific notes]

904

512

Step 1: Connect  520

Task: Describe a time that you used positive thinking or looking forward to something to help you get through a difficult situation.

524

*[Enter text.]*

526

522

514

Central Question: How does the author of the source-material selection communicate emotions using elements of repetition and sound?

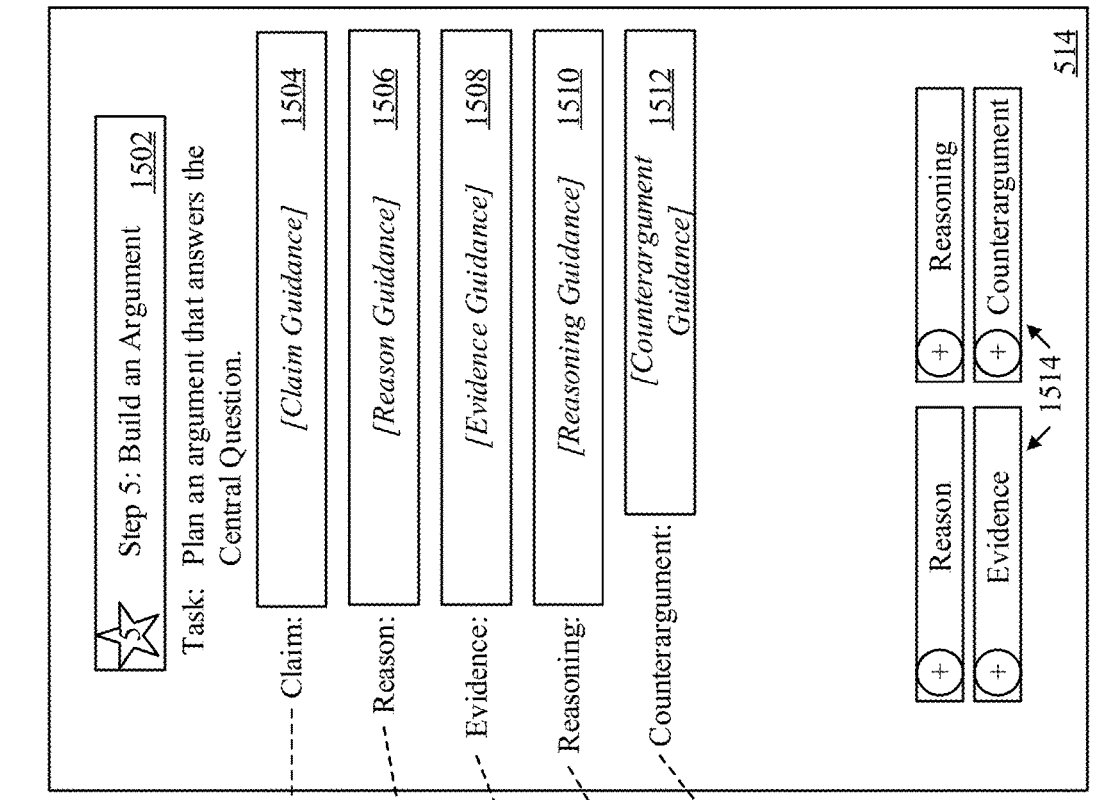
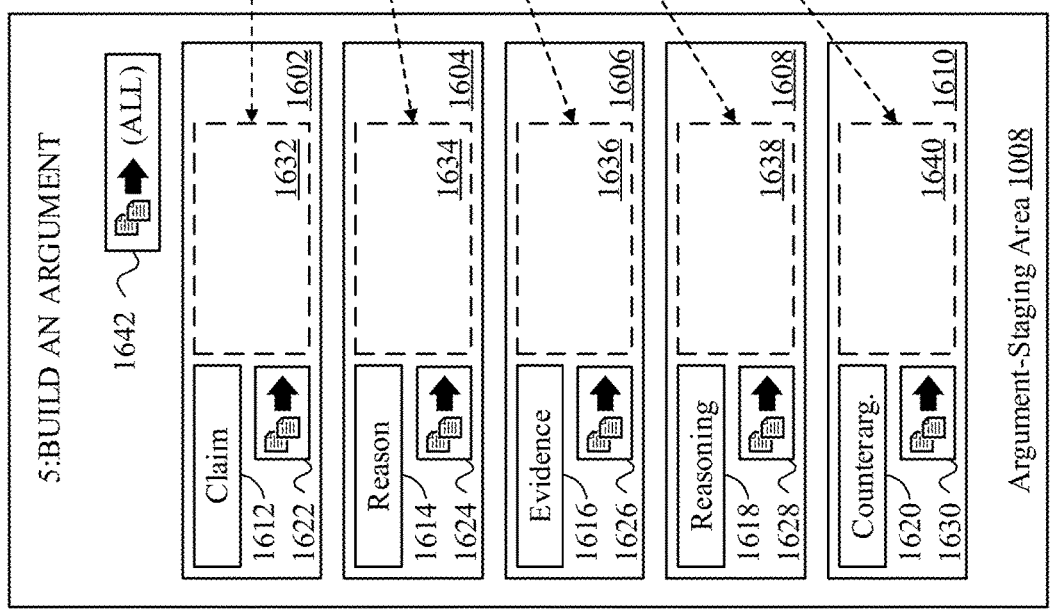
FIG. 16

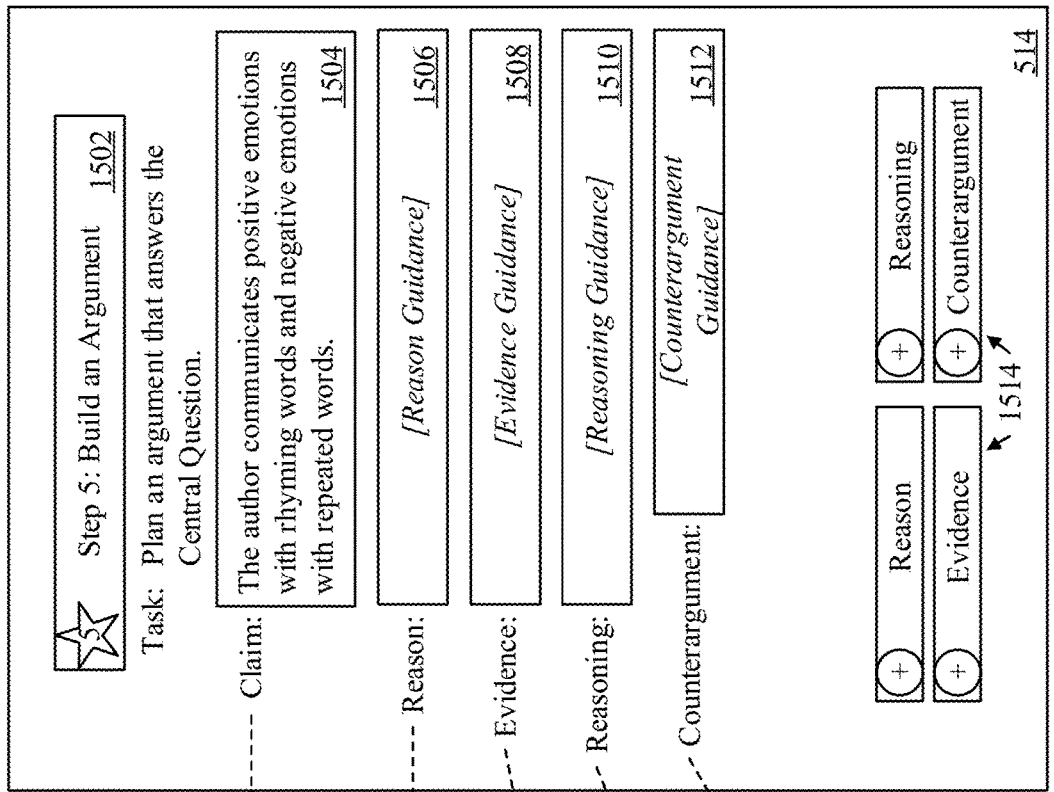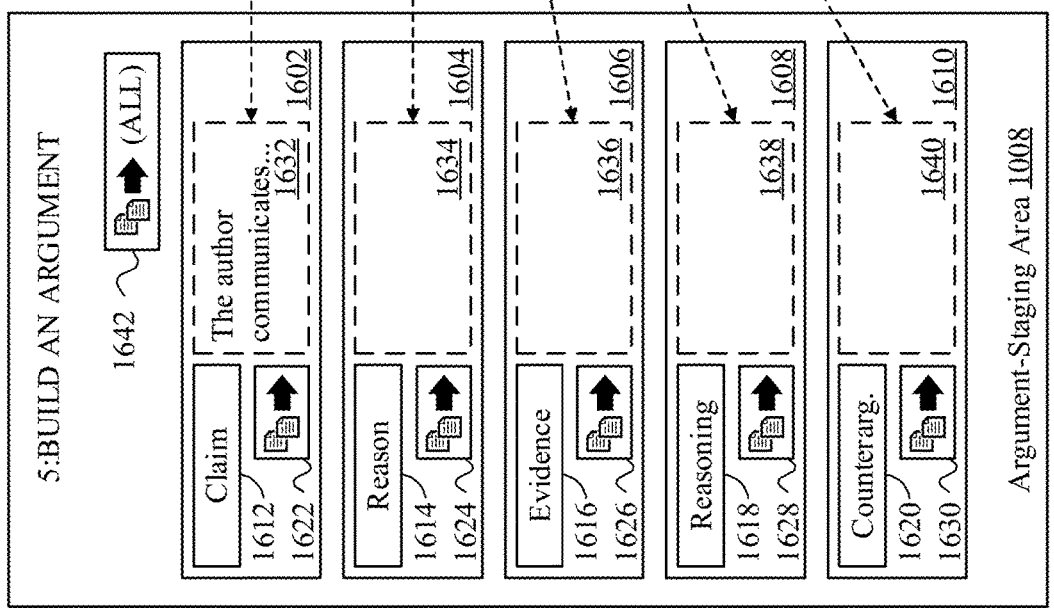
FIG. 17

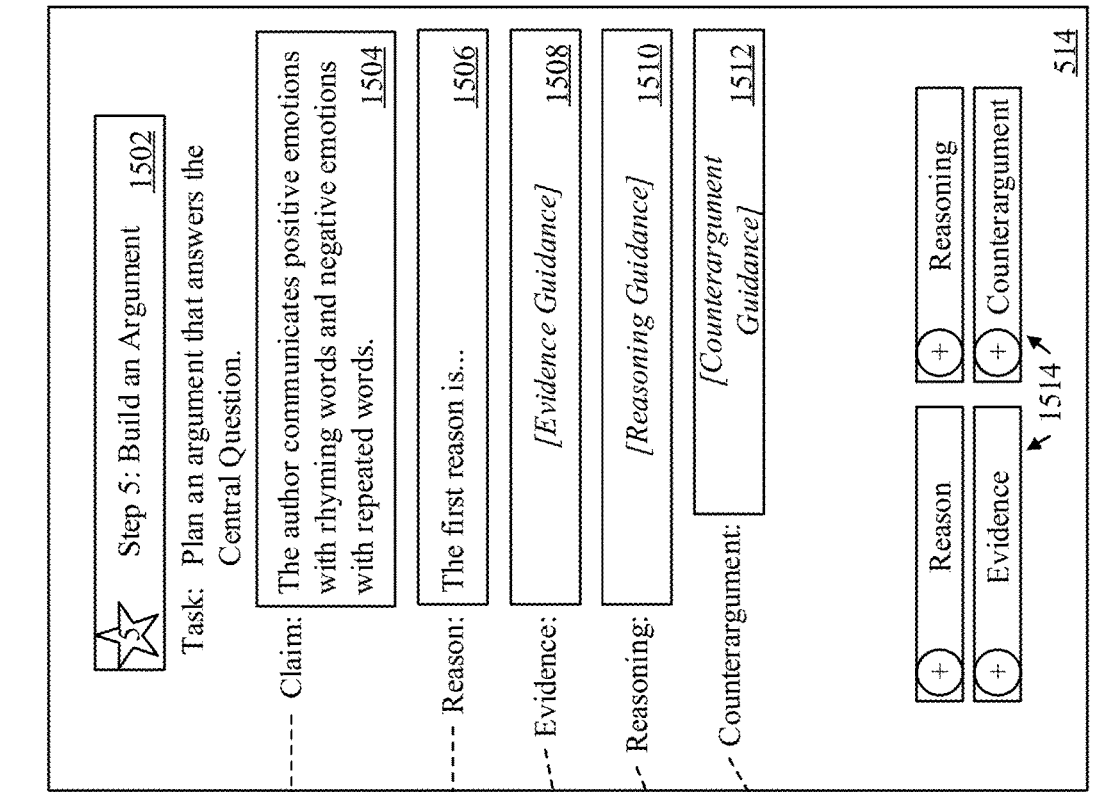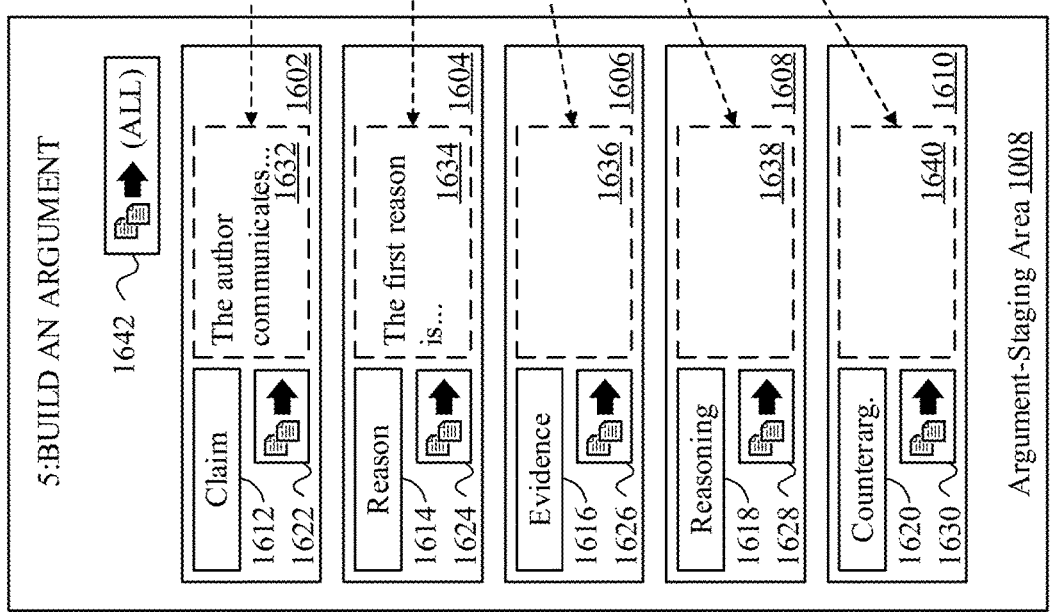
FIG. 18

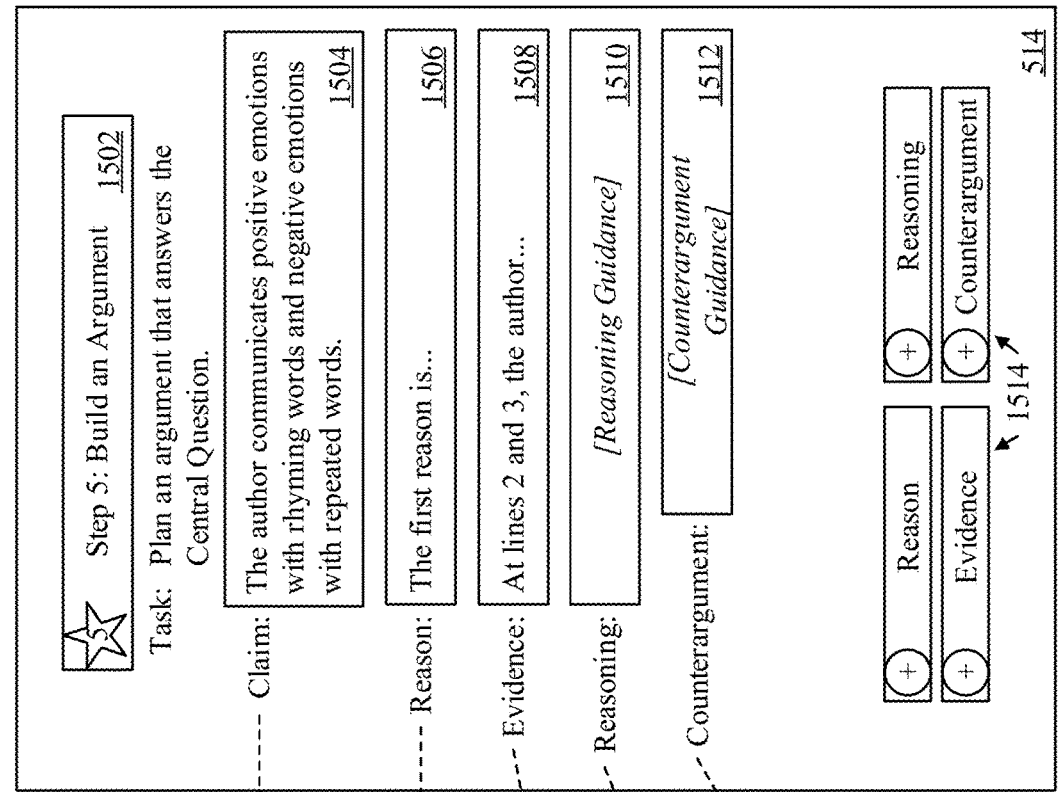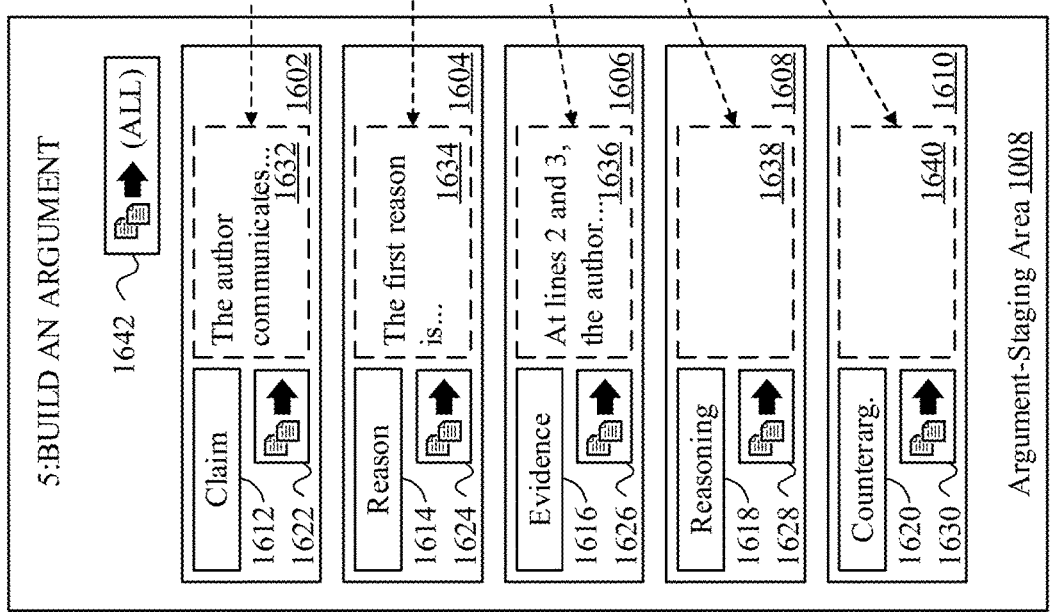
FIG. 19

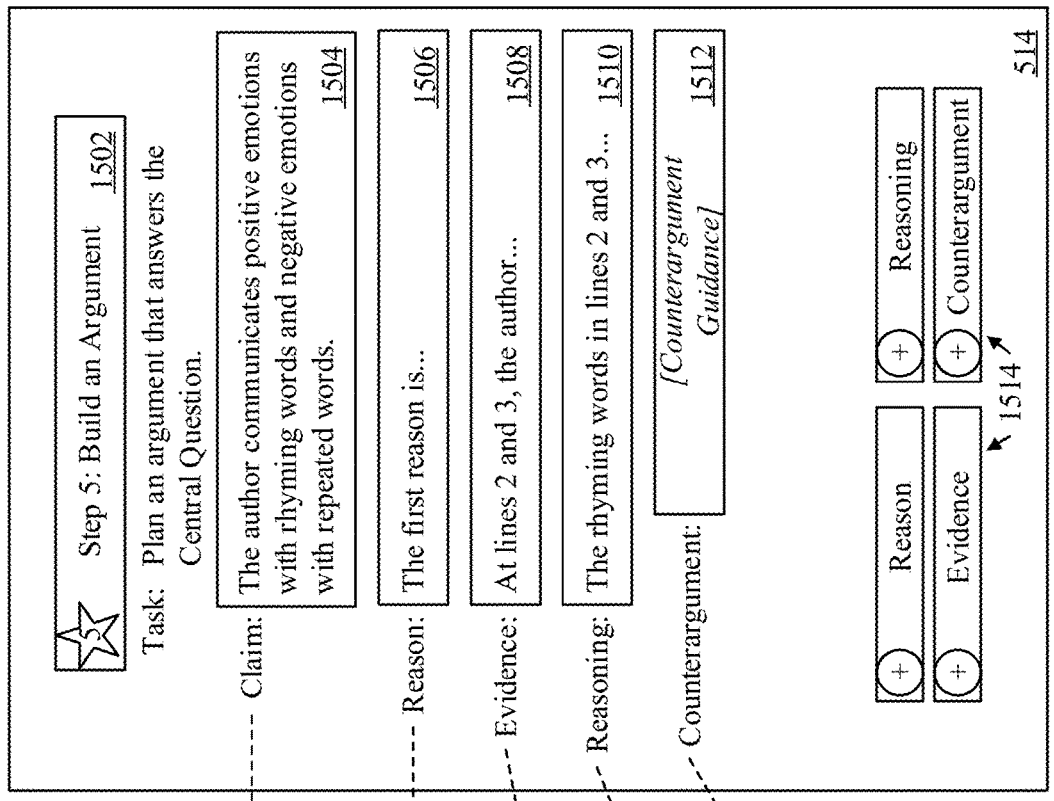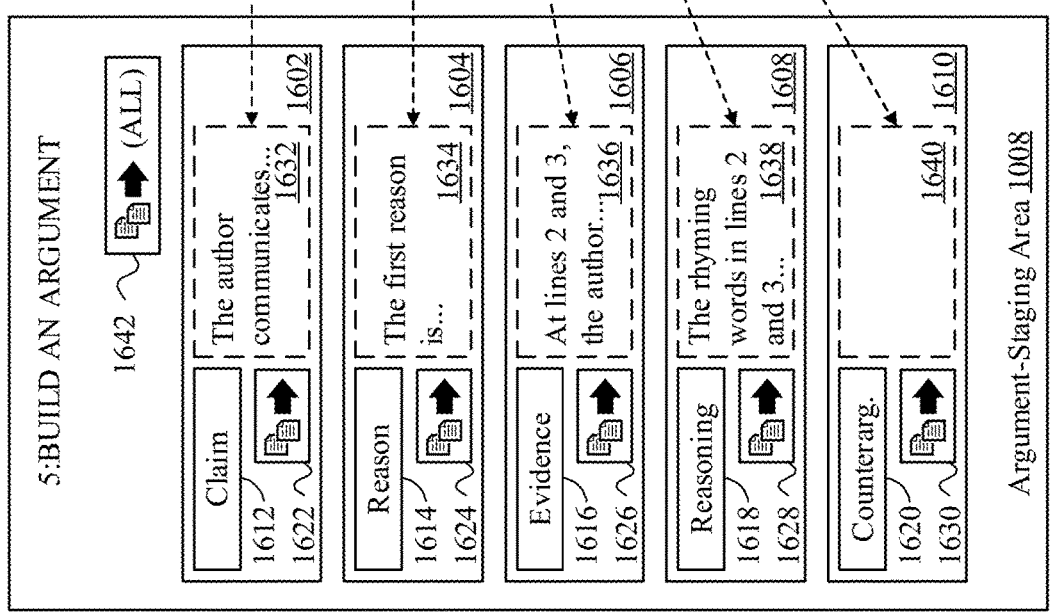
FIG. 20

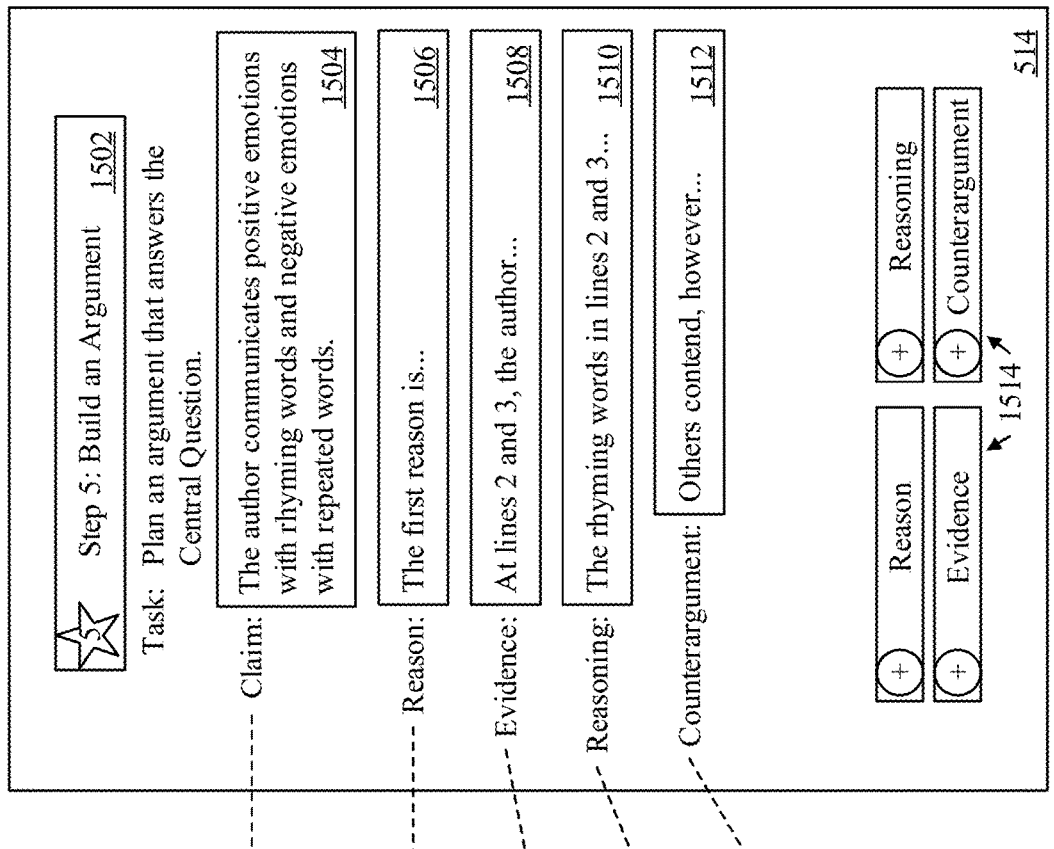
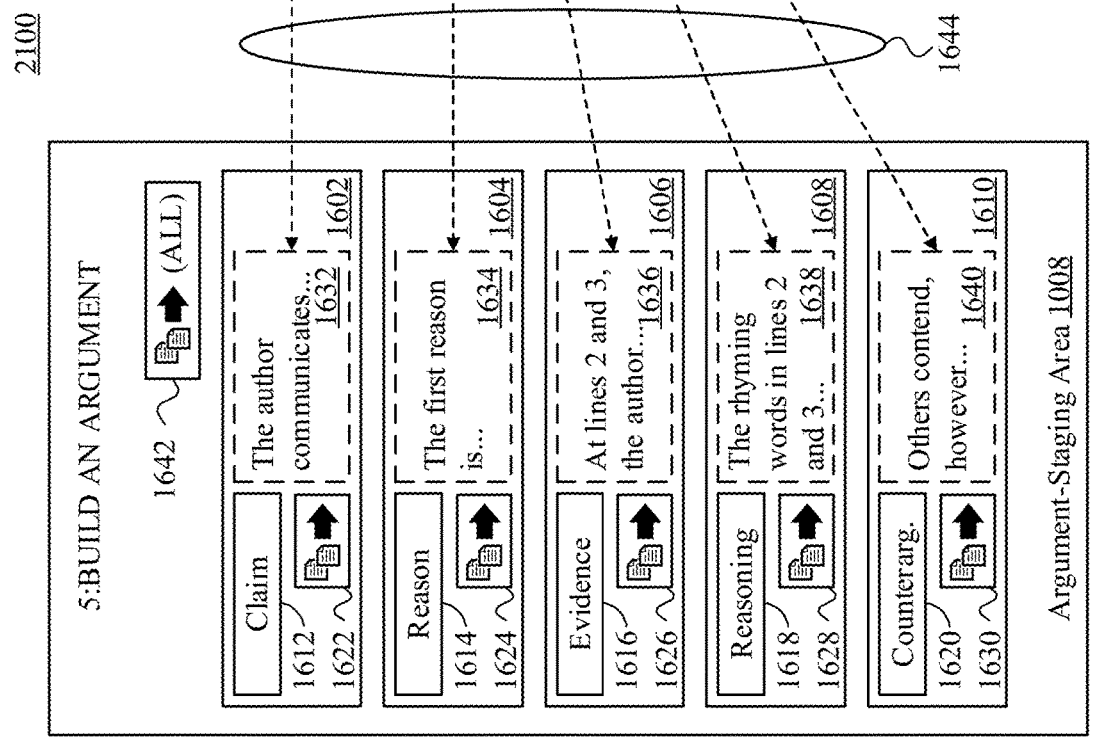
FIG. 21

[Unit:Poetry] {Assignment:"The Roller Coaster" (Course:English 101)} ← 502

① Connect  ② Read  ③ Engage with the Text  ④ Summarize  ⑤ Build an Argument  ⑥ Compose  <PREV

504 ↖  506 ↗

Ⓐ Overview
Ⓑ Vocabulary
Ⓒ Text
Ⓓ Rubric
Ⓔ Highlights
☆ Your Work

508  510

☆ Your Work 1002

1:CONNECT
This is some example text, describing a personal experience. 1004

4:SUMMARIZE
In the first line, the speaker is thinking about his childhood. In the second line, the speaker is wondering why people have to grow old at all. In the last line, the speaker has made a decision to live life to the fullest. 🔼📄 2210  1006

5:BUILD AN ARGUMENT
Argument-Staging Area 1008  2302

Central Question: How does the author of the source-material selection communicate emotions using elements of repetition and sound?

☆ Step 6: Compose 2202

Task: Use "Your Work" to compose an argument that answers the Central Question.

Suggestion: Start with your summary as an introduction to your argument.

📄 ✂ 🔍 🔧  2206

In the first line, the speaker is thinking about his childhood. In the second line, the speaker is wondering why people have to grow old at all. In the last line, the speaker has made a decision to live life to the fullest.  2208

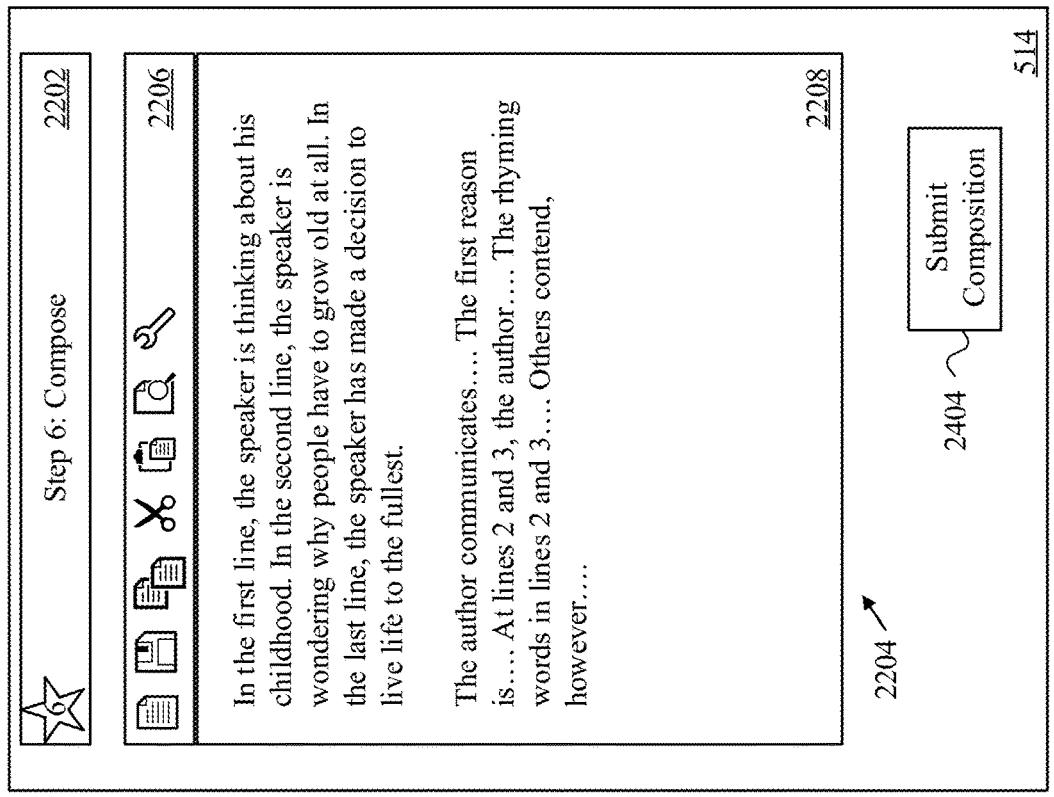
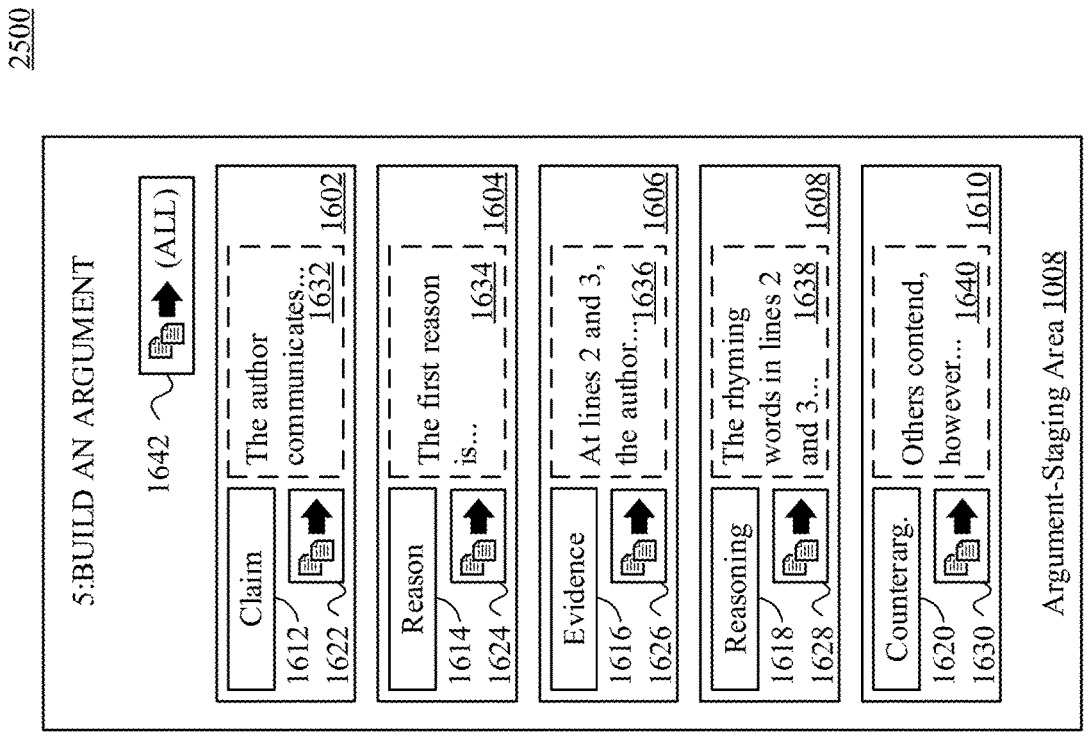
FIG. 25

US 10,741,091 B2

METHODS AND SYSTEMS FOR MITIGATING THE EFFECTS OF INTERMITTENT NETWORK CONNECTIVITY IN EDUCATIONAL SETTINGS

CROSS-REFERENCE TO RELATED APPLICATIONS

This application claims the benefit of U.S. Provisional Patent Application No. 62/292,005, filed Feb. 5, 2016 and entitled "Methods and Systems for User-Interface-Assisted Composition Construction," and U.S. Provisional Patent Application No. 62/292,012, filed Feb. 5, 2016 and entitled "Methods and Systems for Mitigating the Effects of Intermittent Network Connectivity in Educational Settings," the entire contents of both of which are hereby incorporated herein by reference.

BACKGROUND

Today's students are living and studying in an increasingly technological age. Computers, mobile devices, and Internet communication are virtually ubiquitous in modern society. Today's classrooms are no exception. More and more, today's schools are equipped with Internet access in the classroom, be it by way of wired (typically Ethernet) or wireless (typically Wi-Fi) connections. In an example scenario, a given school may connect to the outside world (e.g., to the Internet) by way of a firewalled network access server (NAS), which may in turn provide connectivity to computers on various floors, in various classrooms, in various computer labs, in various offices or other administrative locations, and the like.

Whether in a classroom, in a computer lab, or perhaps at a remote location (e.g., doing homework at home in the evening), a student may access technological educational tools in a number of different ways and via a number of different types of devices. The student may interact with an installed application and/or webpages via a web browser, as examples. The device may be a smartphone, a tablet, a laptop computer, a desktop computer, and/or the like.

Among other purposes, technological educational tools are used in order to effectively teach students and also in order to better prepare those students for the increasingly technological world in which they are growing up and which they are studying in preparation of joining. It is important that technological educational tools are a net positive in the classroom: they should add to the teacher's ability to effectively convey concepts, assign tasks, and assess progress; they should not inefficiently bog down the educational process with cumbersome and inefficient implementations. Technology in the classroom and generally as part of educating students is not necessarily a good in and of itself; it has to be done well.

Overview of Disclosed Embodiments

Disclosed herein are methods and systems for mitigating the effects of intermittent network connectivity in educational settings.

One embodiment takes the form of a method that includes presenting a student assignment via a client-side user interface of an educational platform, where presenting the student assignment includes initially operating the client-side user interface in a read/write mode. The method also includes receiving student input via the client-side user interface in connection with the student assignment, and responsively locally storing the received student input. The method also includes detecting a remote-save-triggering event, and responsively executing a remote-save method that attempts to save the locally stored student input to a remote server. The remote-save method returns either a remote-save-success promise or a remote-save-failure promise. The method also includes continuing to operate the client-side user interface in the read/write mode if the remote-save method returns a remote-save-success promise. The method also includes transitioning to operating the client-side user interface in a read-only mode if the remote-save method returns a remote-save-failure promise.

Another embodiment takes the form of a client-side computing device that includes a client-device communication interface, a client-device user interface, a client-device processor, and client-device data storage containing client-device instructions executable by the client-device processor for causing the client-side computing device to carry out at least the functions listed in the preceding paragraph.

In at least one embodiment, presenting the student assignment via the client-side user interface includes presenting the student assignment via a web browser that is executing on a client-side computing device. In at least one such embodiment, presenting the student assignment via the client-side user interface also includes executing a client-side JavaScript codebase on the client-side computing device. In at least one such embodiment, locally storing the received student input includes storing the received student input in a memory of the client-side computing device.

In at least one embodiment, the received student input includes free-text input. In at least one embodiment, the received student input includes multiple-choice-selection input. In at least one embodiment, the received student input includes highlighting input with respect to a presented source-material selection.

In at least one embodiment, the remote-save-triggering event includes an expiration of a remote-save-triggering timer.

In at least one embodiment, detecting the remote-save-triggering event includes detecting the remote-save-triggering event via the client-side user interface. Such embodiments are referred to for brevity and clarity in the ensuing paragraphs as user-interface-save-trigger embodiments.

In at least one user-interface-save-trigger embodiment, the remote-save-triggering event includes a focus-change event. In at least one user-interface-save-trigger embodiment, the focus-change event includes a user-interface-element-close event. In at least one user-interface-save-trigger embodiment, the focus-change event includes a user-interface-element-hide event. In at least one user-interface-save-trigger embodiment, the focus-change event includes a user-interface-element-switch event; in at least one such user-interface-save-trigger embodiment, the user-interface-element-switch event includes modification of a first user-interface element followed by selection of a second user-interface element; in at least one such user-interface-save-trigger embodiment, the user-interface-element-switch event includes modification of a first user-interface element followed by modification of a second user-interface element.

In at least one user-interface-save-trigger embodiment, the remote-save-triggering event includes a user-interface-element-reorder event.

In at least one embodiment, the method is carried out at least in part by executing a client-side JavaScript codebase on a client-side computing device. Such embodiments are referred to for brevity and clarity in the ensuing paragraphs as JavaScript-codebase embodiments.

In at least one JavaScript-codebase embodiment, the method also includes downloading the client-side JavaScript codebase to the client-side computing device from the remote server.

In at least one JavaScript-codebase embodiment, the client-side JavaScript codebase has a model-view-controller (MVC) architecture. In at least one such JavaScript-codebase embodiment: (i) the client-side JavaScript codebase defines a studentAssignment model that (a) corresponds with the presented student assignment and (b) executes the remote-save method.

In at least one JavaScript-codebase embodiment: (i) the client-side JavaScript codebase further defines a JavaScript studentResponse model that corresponds with an assignable and assessable task and (ii) the studentAssignment model includes a child-studentResponse set of one or more child studentResponse models that each correspond with a respective different assignable and assessable task associated with the presented student assignment. In at least one JavaScript-codebase embodiment, receiving the student input includes a child studentResponse model in the child-studentResponse set receiving the student input.

In at least one JavaScript-codebase embodiment, each child studentResponse model in the child-studentResponse set includes a respective studentResponse-model-specific remote-save method, each of which returns either a studentResponse-model-specific remote-save-success promise or a studentResponse-model-specific remote-save-failure promise.

In at least one JavaScript-codebase embodiment, the studentAssignment model executing the remote-save method includes the studentAssignment model (i) instructing each child studentResponse model in the child-studentResponse set to execute its respective studentResponse-model-specific remote-save method, (ii) returning a remote-save-success promise from the remote-save method if every such studentResponse-model-specific remote-save method returns a studentResponse-model-specific remote-save-success promise, and (iii) returning a remote-save-failure promise from the remote-save method if at least one such studentResponse-model-specific remote-save method returns a studentResponse-model-specific remote-save-failure promise.

In at least one JavaScript-codebase embodiment, a given child studentResponse model executing its respective studentResponse-model-specific remote-save method includes the given child studentResponse model (i) determining whether a status parameter of the given child studentResponse model is in a clean state or a dirty state, where the dirty state corresponds to the given child studentResponse model containing updated student input with respect to a previous execution of the remote-save method, and where the clean state corresponds to the given child studentResponse model not containing such updated student input; (ii) returning a studentResponse-model-specific remote-save-success promise from its respective studentResponse-model-specific remote-save method if the status parameter is in the clean state; and (iii)(a) executing an attempt protocol to attempt to save the updated student input to the remote server if the status parameter is in the dirty state, (b) returning a studentResponse-model-specific remote-save-success promise from its respective studentResponse-model-specific remote-save method if the attempt protocol results in successfully saving the updated student input to the remote server, and (c) instead returning a studentResponse-model-specific remote-save-failure promise from its respective studentResponse-model-specific remote-save method if the attempt protocol does not result in successfully saving the updated student input to the remote server.

In at least one such JavaScript-codebase embodiment, the status parameter of the given child studentResponse model is initially set to the clean state, and the method also includes changing the status parameter of the given child studentResponse model from the clean state to the dirty state responsive to receiving the student input via the client-side user interface; in at least one such JavaScript-codebase embodiment, the method also includes resetting the status parameter of the given child studentResponse model to the clean state in connection with returning a studentResponse-model-specific remote-save-success promise from the respective studentResponse-model-specific remote-save method of the given child studentResponse model.

In at least one JavaScript-codebase embodiment, executing the attempt protocol includes making multiple attempts to save the updated student input to the remote server. In at least one such JavaScript-codebase embodiment, executing the attempt protocol also includes waiting predetermined time periods between attempts to save the updated student input to the remote server. In at least one such JavaScript-codebase embodiment, at least one of the predetermined time periods is longer than at least one earlier one of the predetermined time periods according to a backoff schedule.

In at least one JavaScript-codebase embodiment, the studentAssignment model executing the remote-save method includes the studentAssignment model (i) determining that a subset of the child studentResponse models in the child-studentResponse set contain updated student input with respect to a previous execution of the remote-save method; (ii) instructing each child studentResponse model in the subset to execute its respective studentResponse-model-specific remote-save method; (iii) returning a remote-save-success promise from the remote-save method if every such studentResponse-model-specific remote-save method returns a studentResponse-model-specific remote-save-success promise; and (iv) returning a remote-save-failure promise from the remote-save method if at least one such studentResponse-model-specific remote-save method returns a studentResponse-model-specific remote-save-failure promise.

In at least one JavaScript-codebase embodiment, determining whether a given child studentResponse model in the child-studentResponse set contains updated student input with respect to a previous execution of the remote-save method includes determining whether a status parameter of the given child studentResponse model is in a clean state or a dirty state, where the dirty state corresponds to the given child studentResponse model containing updated student input with respect to a previous execution of the remote-save method, and where the clean state corresponds to the given child studentResponse model not containing such updated student input.

In at least one JavaScript-codebase embodiment, a given child studentResponse model executing its respective studentResponse-model-specific remote-save method includes the given child studentResponse model (i) executing an attempt protocol to attempt to save the updated student input to the remote server; (ii) returning a studentResponse-model-specific remote-save-success promise from its respective studentResponse-model-specific remote-save method if the attempt protocol results in successfully saving the updated student input to the remote server; and (iii) returning a studentResponse-model-specific remote-savefailure promise from its respective studentResponse-model-specific remote-save method if the attempt protocol does not result in successfully saving the updated student input to the remote server.

In at least one such JavaScript-codebase embodiment, the status parameter of the given child studentResponse model is initially set to the clean state, and the method also includes changing the status parameter of the given child studentResponse model from the clean state to the dirty state responsive to receiving the student input via the client-side user interface. In at least one such JavaScript-codebase embodiment, the method also includes resetting the status parameter of the given child studentResponse model to the clean state in connection with returning a studentResponse-model-specific remote-save-success promise from the respective studentResponse-model-specific remote-save method of the given child studentResponse model.

In at least one JavaScript-codebase embodiment, executing the attempt protocol includes making multiple attempts to save the updated student input to the remote server. In at least one JavaScript-codebase embodiment, executing the attempt protocol also includes waiting predetermined time periods between attempts to save the updated student input to the remote server; in at least one such JavaScript-codebase embodiment, at least one of the predetermined time periods is longer than at least one earlier one of the predetermined time periods according to a backoff schedule.

In at least one JavaScript-codebase embodiment: (i) the client-side JavaScript codebase also defines a studentAssignment view and (ii) presenting the student assignment via the client-side user interface includes presenting data from the studentAssignment model according to the studentAssignment view. In at least one such JavaScript-codebase embodiment, detecting the remote-save-triggering event includes the studentAssignment view detecting the remote-save-triggering event.

In at least one embodiment, the remote-save method includes a retry protocol.

In at least one embodiment, the remote-save method returns a remote-save-success promise. In at least one such embodiment, the remote-save method returns at least one remote-save-pending promise prior to returning the remote-save-success promise.

In at least one embodiment, the remote-save method returns a remote-save-failure promise. In at least one such embodiment, the remote-save method returns at least one remote-save-pending promise prior to returning the remote-save-failure promise.

In at least one embodiment, operating the client-side user interface in the read-only mode includes operating the client-side user interface in the read-only mode for a predetermined time period. In at least one such embodiment, the method also includes, after an expiration of the predetermined time period: (i) re-executing the remote-save method; (ii) transitioning back to operating the client-side user interface in the read/write mode if the re-executed remote-save method returns a remote-save-success promise; and (iii) continuing to operate the client-side user interface in the read-only mode if the re-executed remote-save method returns a remote-save-failure promise. In at least one embodiment, the re-executed remote-save method returns a remote-save-success promise; in at least one such embodiment, the method also includes, after transitioning back to operating the client-side user interface in the read/write mode, submitting the student assignment to the remote server for evaluation. In at least one embodiment, the re-executed remote-save method returns a remote-save-failure promise.

Another embodiment takes the form of an educational platform that includes (i) an instantiable client-side user interface having a client-side JavaScript model-view-controller (MVC) architecture that includes at least one client-side model object, at least one client-side view object, and at least one client-side controller object and (ii) a server remote to the client-side user interface, where the server has a server-side JavaScript MVC architecture that includes at least one server-side model object, at least one server-side view object, and at least one server-side controller object. The server includes a server-device communication interface, a server-device processor, and server-device data storage containing server-device instructions executable by the server-device processor for causing the server to (i) operate the server-side MVC architecture and (ii) instantiate the client-side user interface on a client-side computing device. The at least one client-side model object includes a studentAssignment model that corresponds to a student assignment. The at least one client-side view object includes a studentAssignment view for presentation of the studentAssignment model. The studentAssignment view is operable in a number of different modes including a read/write mode and a read-only mode. The client-side computing device includes a client-device communication interface, a client-device processor, and client-device data storage. The client-side computing device is configured to (i) receive the client-side user interface from the server via the client-device communication interface, (ii) store the received client-side user interface in the client-device data storage, and (iii) execute the received and stored client-side user interface using the client-device processor. The client-side user interface, when being executed by the client-side computing device, is configured to (i) present the student assignment at least in part by using the studentAssignment view to present the studentAssignment model, initially operating the studentAssignment view in the read/write mode; (ii) receive student input via the studentAssignment view in connection with the student assignment, and responsively locally store the received student input in the client-device data storage; (iii) detect a remote-save-triggering event via the studentAssignment view, and responsively execute a remote-save method that (a) attempts, via the communication interface, to save the locally stored student input to the server and (b) returns either a remote-save-success promise or a remote-save-failure promise; (iv) continue to operate the studentAssignment view in the read/write mode if the remote-save method returns a remote-save-success promise; and (v) transition to operating the studentAssignment view in the read-only mode if the remote-save method returns a remote-save-failure promise.

In at least one embodiment, the client-side user interface utilizes a static-uniform-resource-locator-(URL) implementation for presenting the student assignment. In at least one such embodiment, the static-URL implementation utilizes asynchronous messaging for attempting to save the locally stored student input to the server. In at least one such embodiment, the asynchronous messaging includes Asynchronous JavaScript and Extensible Markup Language (XML) (AJAX) messaging.

Moreover, any of the variations and permutations described above and/or anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and/or characterize such embodiments.

Furthermore, the above-listed overview of disclosed embodiments is meant to be illustrative and is not meant to be exhaustive, comprehensive, or otherwise limiting. Those of skill in the relevant art will understand this and will further understand that variations and modifications of the above-listed embodiments, and indeed of any of the disclosed embodiments, can be made without departing from the spirit or scope of the present disclosure.

BRIEF DESCRIPTION OF THE DRAWINGS

FIG. 5 is a first example screenshot of a client-side user interface, in accordance with at least one embodiment.

FIG. 6 is a second example screenshot of a client-side user interface, in accordance with at least one embodiment.

FIG. 7 is a third example screenshot of a client-side user interface, in accordance with at least one embodiment.

FIG. 8 is a fourth example screenshot of a client-side user interface, in accordance with at least one embodiment.

FIG. 9 is a fifth example screenshot of a client-side user interface, in accordance with at least one embodiment.

FIG. 16 is a twelfth example screenshot of a client-side user interface, in accordance with at least one embodiment.

FIG. 17 is a thirteenth example screenshot of a client-side user interface, in accordance with at least one embodiment.

FIG. 18 is a fourteenth example screenshot of a client-side user interface, in accordance with at least one embodiment.

FIG. 19 is a fifteenth example screenshot of a client-side user interface, in accordance with at least one embodiment.

FIG. 20 is a sixteenth example screenshot of a client-side user interface, in accordance with at least one embodiment.

FIG. 21 is a seventeenth example screenshot of a client-side user interface, in accordance with at least one embodiment.

FIG. 23 is a nineteenth example screenshot of a client-side user interface, in accordance with at least one embodiment.

FIG. 25 is a twenty-first example screenshot of a client-side user interface, in accordance with at least one embodiment.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment . . . ." And it is for reasons akin to brevity and clarity of presentation that this implied leading clause is not repeated ad nauseum in the below detailed description of the drawings.

DETAILED DESCRIPTION OF THE DRAWINGS

Figure 1:
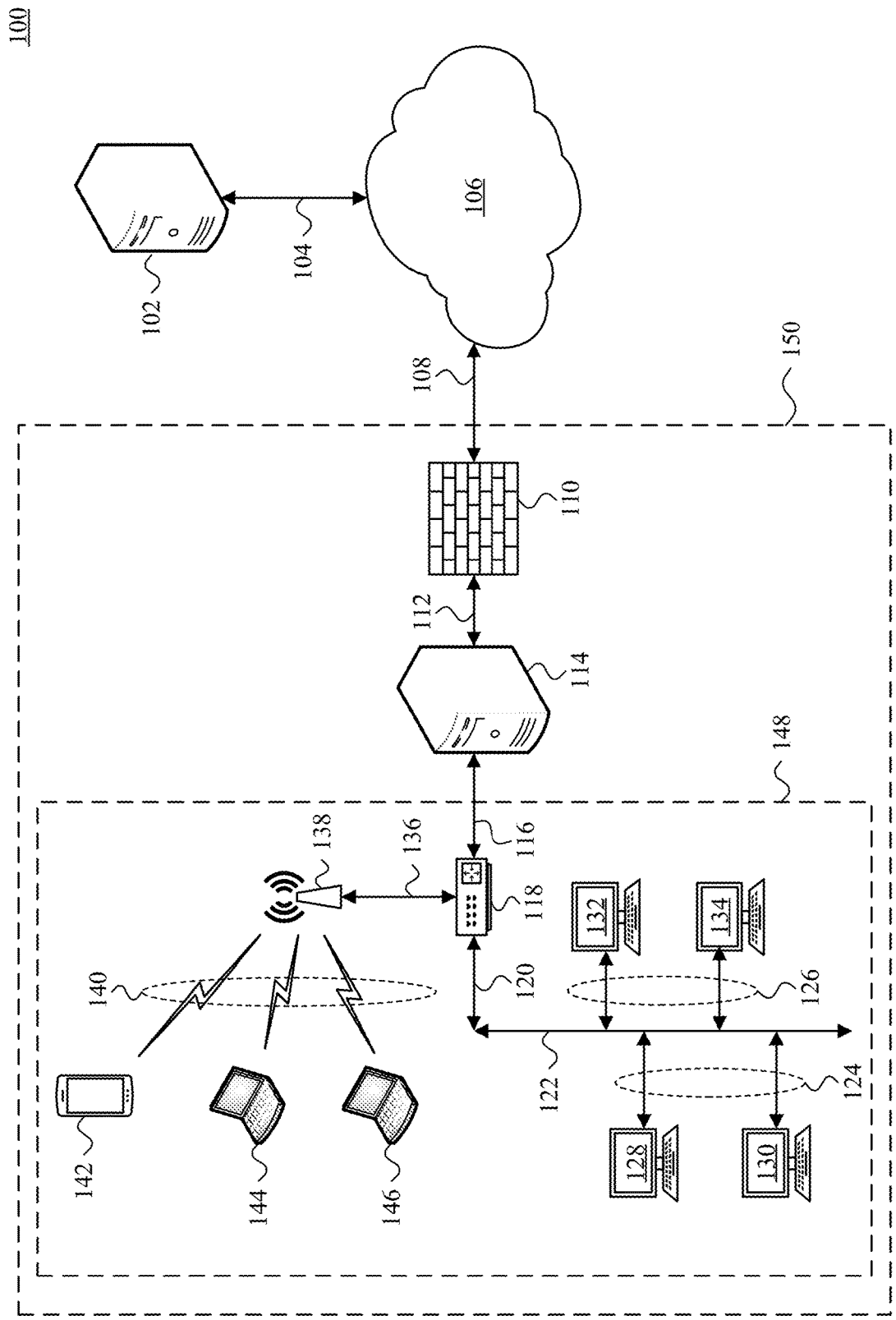
FIG. 1 depicts an example communication system that includes an example server and a number of example client-side computing devices, in accordance with at least one embodiment.

FIG. 1 depicts an example communication system that includes an example server and a number of example client-side computing devices, in accordance with at least one embodiment. In particular, FIG. 1 depicts a communication system 100 that includes a server 102, a data-communication link (i.e., link) 104, a packet-data network 106, a link 108, a firewall 110, a link 112, an NAS 114, a link 116, a router 118, a link 120, a wired local area network (LAN) 122, links 124-126, desktop computers 128-134, a link 136, a wireless access point 138, links 140, a tablet 142, laptop computers 144-146, a classroom-network zone 148, and a school-network zone 150. It should be understood that the communication system 100 is presented by way of example and not limitation, as numerous other example communication systems could be present in various different scenarios.

The server 102 is connected by the link 104 to the packet-data network 106. An example structure of the server 102 is discussed below in connection with FIG. 2. The link 104, like all links discussed in this disclosure, could include one or more wired links, one or more wireless links, one or more networks, one or more access points, one or more routers, switches, bridges, computers, etc. And although certain links (e.g., the links 140) are depicted as being wireless links, it is reiterated that any one or more of the links discussed herein could be wired and/or wireless in nature. Furthermore, the packet-data network 106 may be, include, be part of, be connected to, or be independent of the global network of networks commonly known as the Internet. Entities that communicate via the packet-data network 106 may do so using Internet Protocol (IP) communication, and may be identified using IP addresses.

As mentioned above, the communication system 100 includes the school-network zone 150 that itself includes the classroom-network zone 148. These designations are by way of example and not limitation. In the depicted example, the firewall 110 is connected to the packet-data network 106 via the link 108. The firewall 110 may act to protect entities within the school-network zone 150 from malicious and unwanted communication, among other functions. The firewall 110 is connected via the link 112 to the NAS 114, which may serve, via the firewall 110, as a point of contact to the outside world (e.g., to the packet-data network 106) for all entities within the school-network zone 150. The link 116 connects the NAS 114 with the entities that are within the classroom-network zone 148, which may represent computing and communication entities that are associated with a particular classroom, as an example. In particular, the link 116 connects the NAS 114 with the router 118. It is noted that the NAS 114 and/or another device may handle routing duties, in which case the router 118 could simply be a bridge, switch, or the like; for convenience, that device is referred to herein as the router 118.

The router 118 is connected via the link 120 to the wired LAN 122, which in turn is connected by the links 124 with the desktop computers 128 and 130 and by the links 126 with the desktop computers 132 and 134. Each of the desktop computers 128-134 may include a typical setup having a monitor, keyboard, mouse, and the like. The router 118 is also connected via the link 136 to the wireless access point 138, which in turn is connected via the links 140 with the tablet 142 and with the laptop computers 144 and 146. It is noted that the term client-side computing device is used herein, and that each of the desktop computers 128-134, the tablet 142, and each of the laptop computers 144 and 146 are an example of a client-side computing device as that term is used in this disclosure. And there could be other types of client-side computing devices as well, such as but not limited to smartphones. An example structure of an example client-side computing device is discussed below in connection with FIG. 3.

Figure 2:
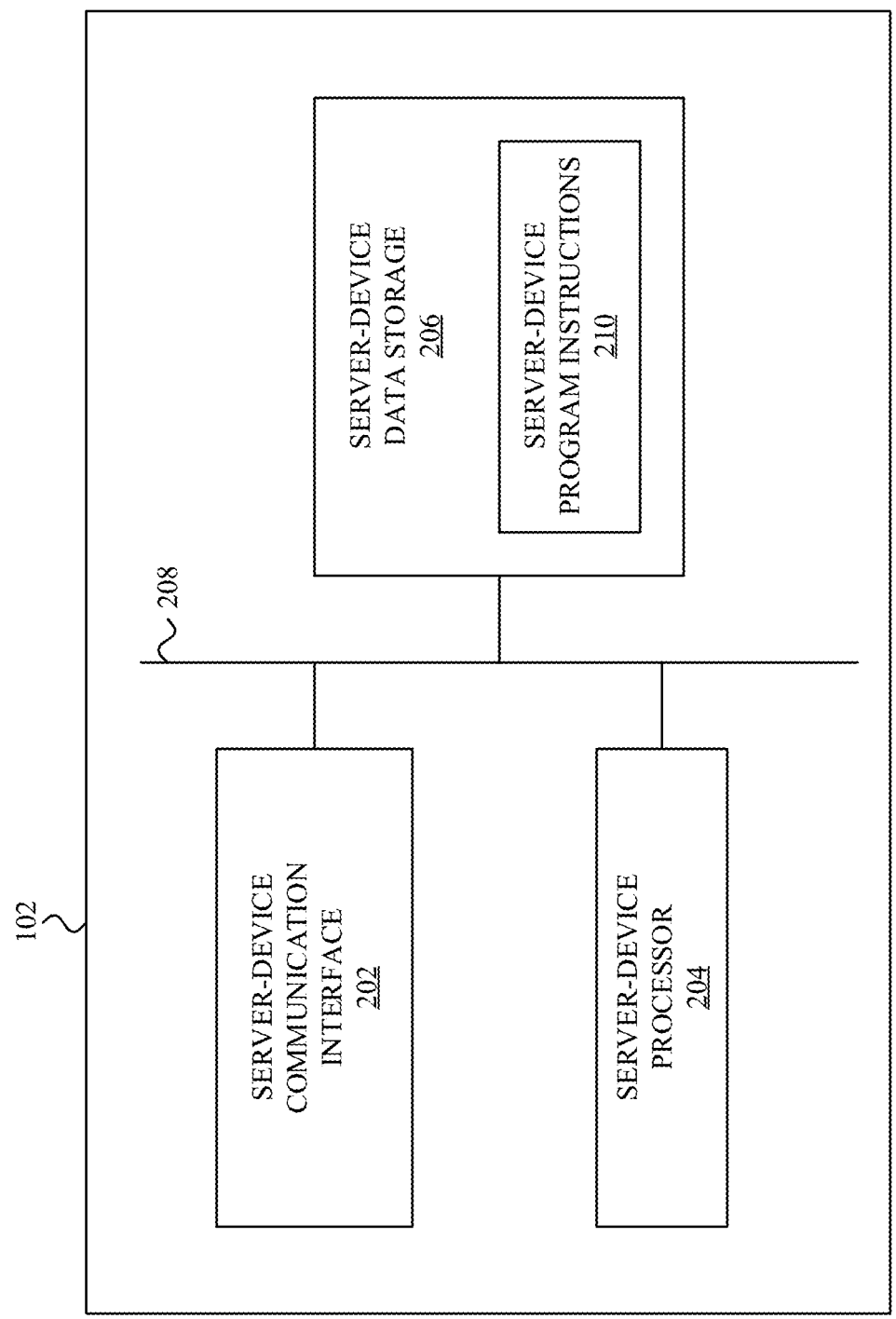
FIG. 2 depicts an example structure of the example server of FIG. 1, in accordance with at least one embodiment.

FIG. 2 depicts an example structure of the example server of FIG. 1, in accordance with at least one embodiment. As depicted in the example of FIG. 2, the server 102 includes a server-device communication interface 202, a server-device processor 204, and server-device data storage 206, all of which are communicatively connected by a server-device system bus 208. The structure of the server 102 that is presented in FIG. 2 is by way of example and not limitation, as other structures could be utilized as well or instead in different implementations. In some instances, the server 102 may also include a server-device user interface (not depicted).

The server-device communication interface 202 may include one or more wireless-communication interfaces (for communicating according to, e.g., LTE, Wi-Fi, Bluetooth, and/or the like) and/or one or more wired-communication interfaces (for communicating according to, e.g., Ethernet, USB, and/or the like). As such, the server-device communication interface 202 may include any necessary hardware (e.g., chipsets, antennas, Ethernet cards, etc.), any necessary firmware, and any necessary software for conducting one or more forms of communication with one or more other entities as described herein.

The server-device processor 204 may include one or more processors of any type deemed suitable by those of skill in the relevant art, some examples including a general-purpose microprocessor and a dedicated digital signal processor (DSP).

The server-device data storage 206 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. The server-device data storage 206 contains server-device program instructions 210 that are executable by the server-device processor 204 for carrying out various server-side functions described herein.

Figure 3:
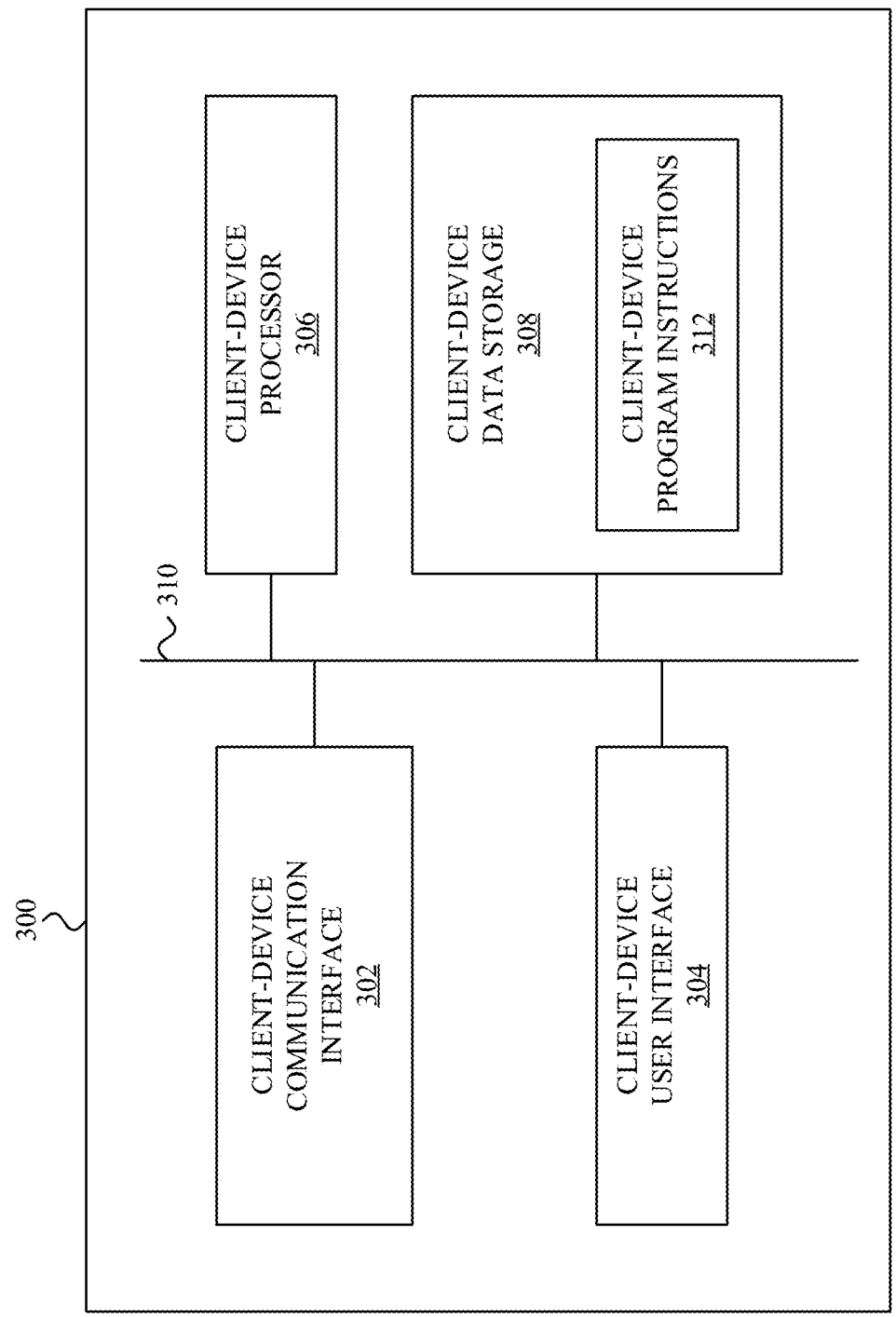
FIG. 3 depicts an example structure of an example one of the client-side computing devices of FIG. 1, in accordance with at least one embodiment.

FIG. 3 depicts an example structure of an example one of the client-side computing devices of FIG. 1, in accordance with at least one embodiment. In particular, FIG. 3 depicts an example structure of a representative client-side computing device 300, which could represent the desktop computer 128, the desktop computer 130, the desktop computer 132, the desktop computer 134, the tablet 142, the laptop computer 144, the laptop computer 146, or any other client-side computing device deemed suitable by those of skill in the art for a particular implementation. As depicted in the example of FIG. 3, the client-side computing device 300 includes a client-device communication interface 302, a client-device user interface 304, a client-device processor 306, and client-device data storage 308, all of which are communicatively connected by a client-device system bus 310. The structure of the client-side computing device 300 that is presented in FIG. 3 is by way of example and not limitation, as other structures could be utilized as well or instead in various different implementations.

The client-device communication interface 302 may include one or more wireless-communication interfaces (for communicating according to, e.g., LTE, Wi-Fi, Bluetooth, and/or the like) and/or one or more wired-communication interfaces (for communicating according to, e.g., Ethernet, USB, and/or the like). As such, the client-device communication interface 302 may include any necessary hardware (e.g., chipsets, antennas, Ethernet cards, etc.), any necessary firmware, and any necessary software for conducting one or more forms of communication with one or more other entities as described herein.

The client-device user interface 304 may include one or more input devices (a.k.a. components and the like) and/or one or more output devices (a.k.a. components and the like). With respect to input devices, the client-device user interface 304 may include one or more touchscreens, keyboards, mice, trackpads, touchpads, other pointing devices, buttons, switches, knobs, microphones, and/or the like. With respect to output devices, the client-device user interface 304 may include one or more displays, monitors, speakers, LEDs, and/or the like. Moreover, one or more components (e.g., an interactive touchscreen-and-display component) of the client-device user interface 304 could provide both user-input and user-output functionality. And certainly other user-interface components could be used in various different contexts.

The client-device processor 306 may include one or more processors of any type deemed suitable by those of skill in the relevant art, some examples including a general-purpose microprocessor and a dedicated DSP.

The client-device data storage 308 may take the form of any non-transitory computer-readable medium or combination of such media, some examples including flash memory, ROM, and RAM to name but a few, as any one or more types of non-transitory data-storage technology deemed suitable by those of skill in the relevant art could be used. The client-device data storage 308 contains client-device program instructions 312 that are executable by the client-device processor 306 for carrying out various client-side functions described herein, including but not limited to the method 400 of FIG. 4A.

Before proceeding with the balance of this detailed description, a particular linguistic point is worth making. The following two different terms are used in this disclosure: (i) client-side user interface and (ii) client-device user interface. The latter, client-device user interface, refers to hardware components, software drivers, and the like that are part of and/or installed on a given client-side computing device, consistent with the above description of the client-device user interface 304. Thus, a given client-device user interface is a permanent or at least semi-permanent part of its respective client-side computing device. The former, client-side user interface, refers in this disclosure to the executing codebase and corresponding presented visual elements that are particular to the present systems and methods.

Some characteristics of a representative embodiment are that (i) the codebase is a downloaded JavaScript codebase and (ii) the client-side user interface is presented via a web browser (that itself would naturally be presented via the client-device user interface (e.g., the display monitor) of the client-side computing device that has downloaded and is executing the JavaScript codebase). Of course these are only examples, but they serve to illustrate the distinction between client-side user interface and client-device user interface as those terms are used herein. In another example, a client-side computing device is a tablet: the client-device user interface includes the physical touchscreen of that tablet; the client-side user interface of the present methods and systems may be presented in a web browser or an installed application that is executing on the client-side computing device (i.e., tablet). And certainly other examples could be presented here as well.

Figure 4A:
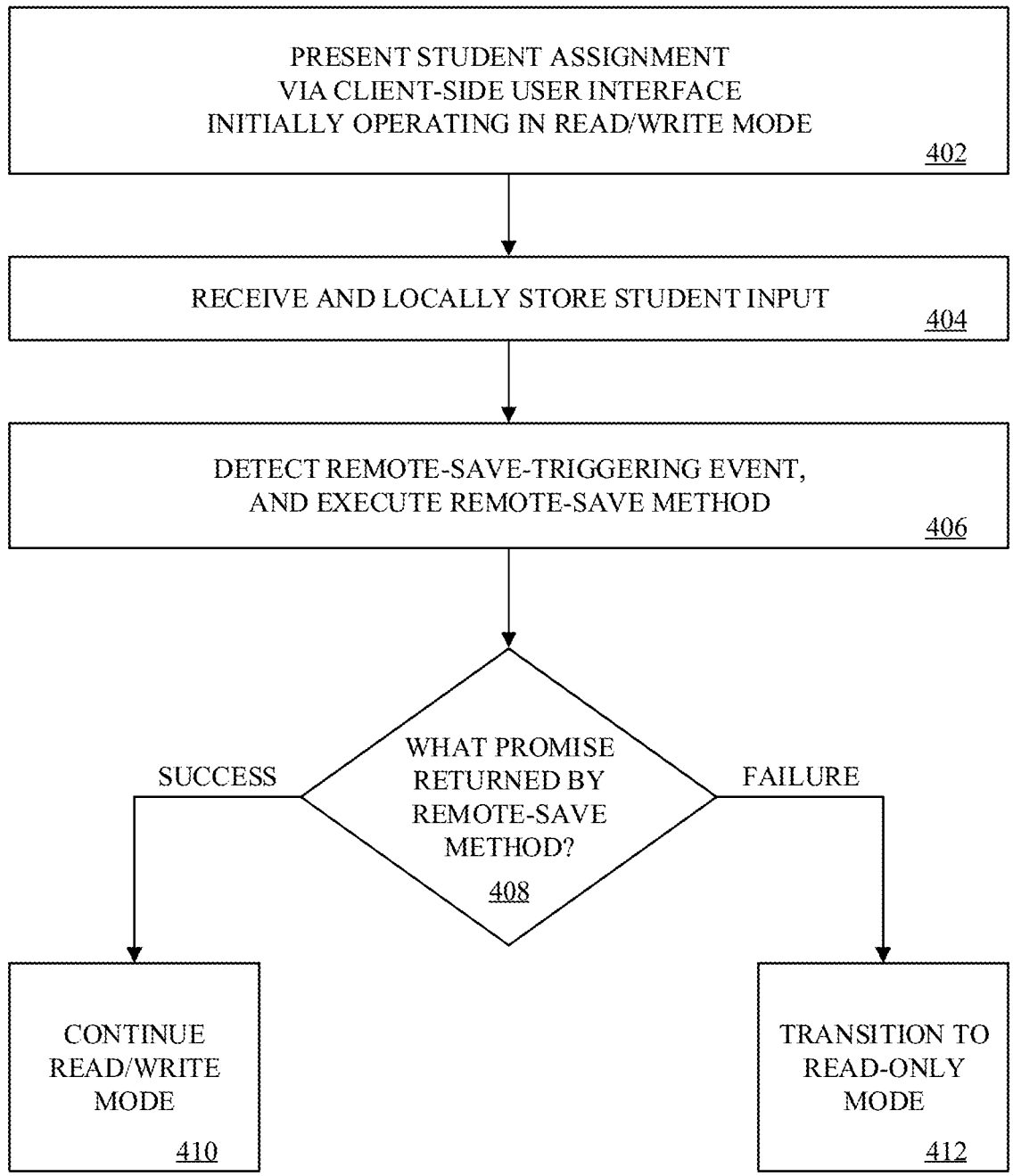
FIG. 4A depicts an example method, in accordance with at least one embodiment.

FIG. 4A depicts an example method, in accordance with at least one embodiment. In particular, FIG. 4A depicts an example method 400 that is described below by way of example and not limitation as being carried out by the desktop computer 128 of FIG. 1. As stated above, the desktop computer 128 is an example of a client-side computing device; as such, any mention of any particular components of the desktop computer 128 will use the 300-series component numbering of FIG. 3. In other examples, any other suitably equipped, programmed, and configured client-side computing device could carry out the method 400.

Prior to further describing the method 400, it is noted that, in various places in the balance of this detailed description, various example screenshots are depicted and described. These are examples of screenshots that could be presented via the client-side user interface of the present systems and methods. In at least one embodiment, these screenshots (as part of the client-side user interface of the present systems and methods) are presented via a web browser that is being executed by the desktop computer 128. Thus, the rendered user-interface elements, text, and so on would correspond with HTML code that is provided to and then displayed by the web browser (e.g., Microsoft Edge®, Microsoft Internet Explorer®, Mozilla Firefox®, Apple Safari®, Google Chrome®, and the like). This HTML code could be generated at least in part by runtime execution of JavaScript code. In at least one embodiment, a static-URL implementation is used across screenshots, such that the displayed URL doesn't change, though asynchronous (e.g., AJAX) messaging can be going on in the background, resulting in changes to the displayed information. Such aspects of modern web programming are within the skill of those in the art, and are thus not exhaustively explained herein.

At step 402, the desktop computer 128 presents a student assignment via a client-side user interface of an educational platform. An example of such presentation of a student assignment is further described below in connection with descriptions of various screenshots. The desktop computer 128 initially operates the client-side user interface in a read/write mode, i.e. in a mode in which the student user can enter and/or modify their input via the client-side user interface. The desktop computer 128 may present the student assignment via a web browser that is executing on the desktop computer 128. Moreover, the desktop computer 128 may carry out this and/or one or more other steps of the method 400 at least in part by way of runtime execution of a JavaScript codebase, which the desktop computer 128 may first download from the server 102 as a result of, as an example, the student user clicking on a link that is associated with the student assignment, perhaps after first logging in to the educational platform that may be hosted on the server 102. And certainly other example implementations could be listed here.

In embodiments in which the desktop computer 128 is presenting the client-side user interface via a web browser, the desktop computer 128 may carry out runtime execution of the JavaScript codebase using what is known in the art as a JavaScript engine that typically is particularly compatible with the particular browser. As one non-limiting example, the JavaScript engine that is used with Google Chrome® is known as Chrome V8. And certainly those of skill in the art know which JavaScript engines go with which browsers.

In general, as known in the art, runtime execution of JavaScript code involves entities known as a call stack and a heap. The call stack is typically a single-threaded execution stack that operates according to a last-in-first-out (LIFO) model. To avoid blocking and achieve asynchronous execution, it is often the case that browser implementations use what are known as web application programming interfaces (APIs) to offload functions from the call stack until those functions have been completed. In general, web APIs return their results to what is known as the task queue after completion of their particular task or function; a structure known as the event loop then pushes actions on to the call stack at times when the call stack as empty and the task queue is not. Some examples of asynchronous events include AJAX messaging and what are known in the art as setTimeouts. Other examples could be listed here as well.

Figure 4B:
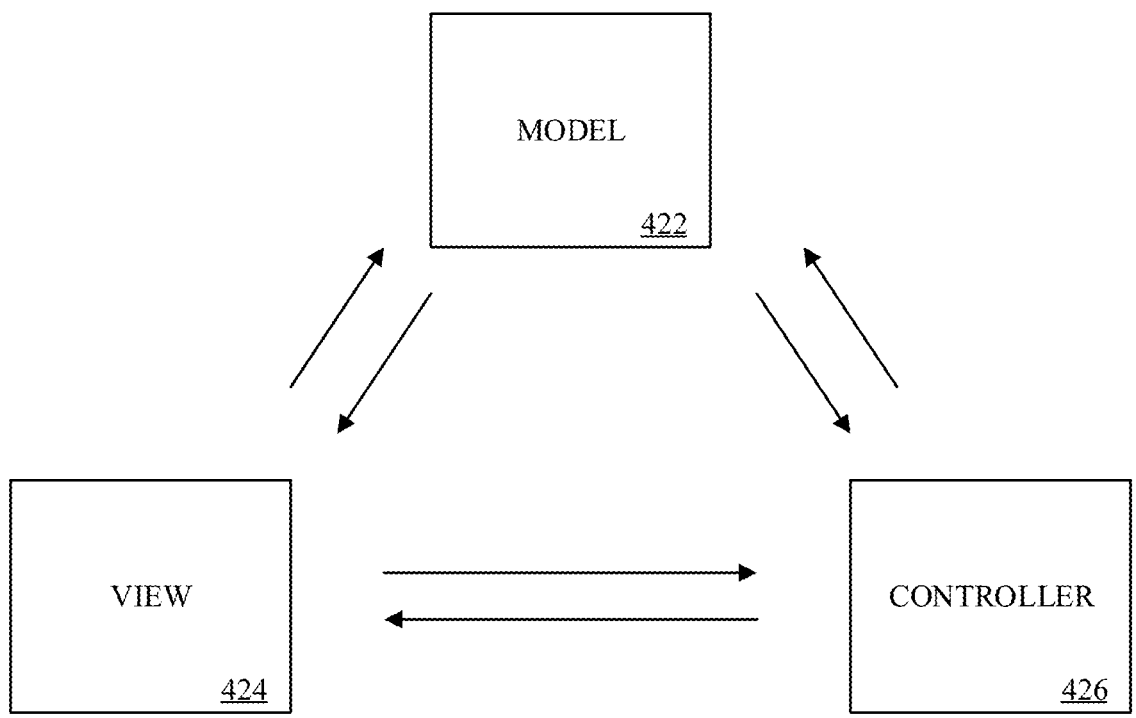
FIG. 4B depicts an example MVC architecture, in accordance with at least one embodiment.

In at least one embodiment, the client-side JavaScript codebase has what is known in the art as an MVC architecture. A general depiction of an MVC architecture is shown in FIG. 4B, which depicts an MVC architecture 420 that includes a model 422, a view 424, and a controller 426. It is noted that in the MVC architecture 420—or any other MVC architecture, there could be more than one model, more than one view, and/or more than one controller. Each model, each view, and each controller in the MVC architecture 420 is a programming object having defined data, defined data structures, defined methods (i.e., callable functions), and the like. Two-way messaging communication can exist between any two of the three of model, view, and controller, as generally depicted by the three sets of double arrows in FIG. 4B.

Generally speaking, a model is used to define a given instance of substance in a given architecture; as described below, among the models that are implemented in the present methods and systems are (i) a studentAssignment model that corresponds generally to an overall assignment to a student and (ii) a studentResponse model that corresponds to a more granular assignable and assessable task within such an overall assignment. Moreover, a view is typically used to define a template for presentation of the underlying substantive data of one or more models. And a controller is generally used to manage messaging between models and views, as well as to carry out additional administrative functions, as known to those in the art.

As described above, the MVC architecture 420 may define a model that is referred to herein as a studentAssignment model and that corresponds with the student assignment that the desktop computer 128 presents starting at step 402. In at least one such embodiment, the runtime-executing client-side JavaScript codebase further defines a JavaScript studentResponse model that corresponds with an assignable and assessable task that forms a modular subpart of that overall student assignment. Moreover, the studentAssignment model may include a set of one or more child studentResponse models that each correspond with a respective different assignable and assessable task associated with the presented student assignment.

A number of example screenshots are now depicted and described. In an example architecture, as described more fully below, a single JavaScript studentAssignment model corresponds to all of the example screenshots and perhaps more; i.e., to the overall assignment that is described below pertaining to an example poem. In this example architecture, that studentAssignment model includes multiple child studentResponse models that each correspond to separate assignable and assessable tasks, i.e., to the various Steps 1-6 that are described below. Following the description of the example screenshots in FIGS. 5-25, this description continues with explanation of the correlation in at least one embodiment between the various programming structures (e.g., models) described herein, as well as the various steps of the method 400.

FIG. 5 shows an example first screen that a student might be presented with after first passing through one or more conventional HTML, screens directing the student through activities such as logging in to an account and clicking on the particular assignment with which the screenshot 500 is associated. The screenshot 500 includes conventional window-management icons 502, which are selectable for functions such as minimize, restore, and close. The screenshot 500 also includes a heading 504 that lists an example course ("English 101"), an example unit ("Poetry") in that course, and the title ("The Roller Coaster") of the particular (fictitious) poem on which this example assignment is based. The screenshot 500 also includes a central-question element 510, which displays the overall question to which the student is ultimately tasked with writing an argument in response, as is more fully explained below.

The screenshot 500 also includes a content-display-pane control panel 508, which has six separately selectable elements that are labeled "(A) Overview," "(B) Vocabulary," "(C) Text," "(D) Rubric," "(E) Highlights," and "(F) Your Work." The starred "A" icon corresponding with the "Overview" element indicates that the "Overview" element is the currently selected element in the content-display-pane control panel 508. The screenshot 500 further includes a content-display pane 512, in which the currently displayed content is determined by which element of the content-display-pane control panel 508 is currently selected. In the screenshot 500, in which the "Overview" element of the content-display-pane control panel 508 is currently selected, the content-display pane 512 includes (i) a content-display-pane header 516 having a matching starred "A" icon and header text reading "Topic Overview" and (ii) a text-display element 518 that includes text that provides an overview of the source-material selection (i.e., the poem) that is the subject of this assignment; in FIG. 5, there is a placeholder sentence for such an overview (rather than an actual substantive overview).

The screenshot 500 also includes a working-display-pane control panel 506, which has six separately selectable elements that are labeled "(1) Connect," "(2) Read," "(3) Engage with the Text," "(4) Summarize," "(5) Build an Argument," and "(6) Compose." The working-display-pane control panel 506 also includes navigational controls: in FIG. 5, there is only a "next" navigational control since the currently selected element is the first one (i.e., "Connect") (as indicated by the starred "1" icon); in other figures in which one of the middle four elements is currently selected, both a "previous" navigational control and a "next" navigational control are displayed; in figures in which the last element (i.e., "Compose") is currently selected, there is only a "previous" navigational control, as is conventional in the art. It is noted that the six separately selectable elements in the working-display-pane control panel 506 correspond to an ordered series of predefined different types of user-input stages for producing the composition based on the source-material selection, as is more fully described below.

The screenshot 500 also includes a working-display pane 514, in which the currently displayed content is determined by which element of the working-display-pane control panel 506 is currently selected. In the screenshot 500, in which the "Connect" element of the working-display-pane control panel 506 is currently selected, the working-display pane 514 includes (i) a corresponding working-pane-display header 520 having a matching starred "1" icon and header text reading "Step 1: Connect," (ii) some text instructions that indicate to the student what their (example) assigned task is for this first step, and (iii) a text-editor element 522 that includes a text-editor toolbar 524 and a text-entry input field 526; the student is tasked with entering text in the text-entry input field 526 that is responsive to the task instructions.

In at least one embodiment, the client-side user interface responds to any (or periodically detected, or the like) text changes in the text-entry input field 526 by locally saving the current text and marking (in a manner not necessarily apparent to the student user) the text-entry input field 526 as being in a "dirty" state (i.e., containing different input than what (if anything) had previously been saved). As is known in the arts of web programming, memory (e.g., cache) design and management, and the like, elements are often initialized to a "clean" state, marked "dirty" upon a substantive change being detected, and then reset to clean after that substantive change has been saved to an upstream (and typically relatively more stable) entity such as a remote server, a hard drive, and/or the like. In various different embodiments, the client-side user interface may include input-field-specific indications of student input having been locally and/or remotely stored; moreover, overall indications of whether all then-entered student input has been locally and/or remotely stored may be provided as well. And certainly other example implementations could be listed here.

The next five figures (i.e., FIGS. 6-10) correspond to respective screenshots that the client-side user interface presents to the student user in at least one embodiment when that student user successively clicks one by one down the selectable elements of the content-display-pane control panel 508. Thus, FIG. 6 corresponds to the student having clicked on the "(B) Vocabulary" element, FIG. 7 corresponds to the student having thereafter clicked on the "(C) Text" element, and so forth. It is noted that, while not required, it is the case in this series of screenshots that clicking down through those elements does not change what is currently displayed in the working-display pane 514. It is also noted that, in the depicted embodiment, the central-question element 510 remains displayed on each of those screenshots as well, to keep the central question in the mind of the student user throughout their work on the various assignable and assessable subtasks that make up the overall assignment.

As stated above, FIG. 6 corresponds to a scenario in which the student, while viewing the screenshot 500 of FIG. 5, clicked on the "(B) Vocabulary" element in the content-display-pane control panel 508, resulting in the screenshot 600 of FIG. 6. Elements that are common to both the screenshot 500 and the screenshot 600 are not redundantly mentioned here, and this convention is carried through the balance of this detailed description of the drawings. As can be seen in FIG. 6, the content-display pane 512 now includes (i) a content-display-pane header 602 having a matching starred "B" icon and header text reading "Topic Vocabulary" and (ii) a text-display element 604 that includes a selection of vocabulary words pertaining to the source-material selection. By way of example, five placeholder words (with corresponding parts of speech and definitions) are displayed in the screenshot 600.

If, while viewing the screenshot 600, the student clicked on the "(C) Text" element in the content-display-pane control panel 508, the student (in this depicted example embodiment) would then be presented with the screenshot 700 of FIG. 7. The content-display pane 512 now includes (i) a content-display-pane header 702 having a matching starred "C" icon and header text reading "Source-Material Text," (ii) a text-display element 704, and (iii) an embedded media player 706. The text-display element 704 lists the title and the author of the subject source-material selection, the text of the source-material selection itself, and an embedded image 708 that may have been selected as an appropriate accompaniment to the source-material selection. The embedded media player 706 may be operable to provide the student with an audible recitation of the source-material selection, which may enhance the student's learning process. In some embodiments, the embedded media player 706 plays video instead or as well.

The student may next click on the "(D) Rubric" element in the content-display-pane control panel 508, and accordingly be presented with the screenshot 800 of FIG. 8. The content-display pane 512 now includes (i) a content-display-pane header 702 having a matching starred "D" icon and header text reading "Rubric" and (ii) a text element 804 that includes some evaluation-criteria text pertaining to this overall assignment and that also includes a selectable element 808 that could provide the student with a complete rubric for the assignment, perhaps in the form of a downloaded PDF file, a webpage opening in a new tab or window, and/or some other option deemed suitable by those of skill in the art. As known in the educational arts, a rubric is a set of evaluation criteria and/or expectations for a given assignment, unit, topic, semester, course, and/or the like. In the depicted embodiment, the rubric pertains to this assignment, perhaps drawing on more pervasive themes that the teacher wishes to reinforce across multiple assignments.

If the student next clicks on the "(E) Highlights" element in the content-display-pane control panel 508, the student may next be presented with the screenshot 900 of FIG. 9. The content-display pane 512 now includes (i) a content-display-pane header 902 having a matching starred "E" icon and header text reading "Highlights" and (ii) a display element 904 that includes an example set of three highlight annotations that the student may have made while participating in Step 3 (i.e., "Engage with the Text"), which is described below. It can be seen that each of the three highlight annotations includes a respective indication of category or type of highlight (which may be represented by a respective color, as described below), the word itself that was highlighted by the student, and any highlight-specific notes that the student may have entered in connection with highlighting that particular word (or phrase).

Figure 10:
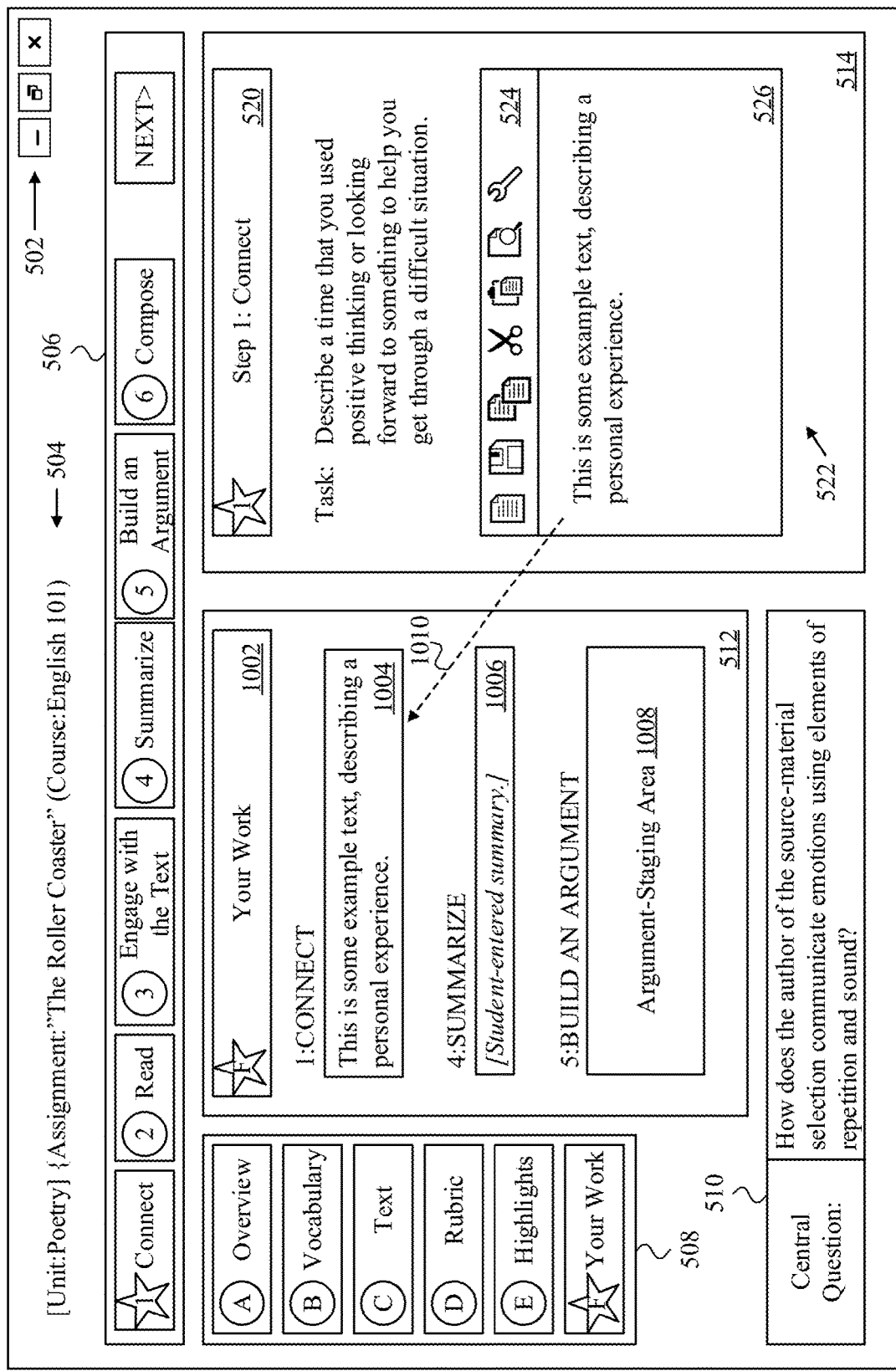
FIG. 10 is a sixth example screenshot of a client-side user interface, in accordance with at least one embodiment.

The student may next, while viewing the screenshot 900 of FIG. 9, click on the "(F) Your Work" element of the content-display-pane control panel 508, resulting in the student being presented with the screenshot 1000 of FIG. 10. In the screenshot 1000, the content-display pane 512 now includes (i) a content-display-pane header 1002 having a matching starred "F" icon and header text reading "Your Work," (ii) a connect element 1004 that corresponds with Step 1 (i.e., "Connect"), (iii) a summarize element 1006 that corresponds with Step 4 (i.e., "Summarize"), and (iv) an argument-staging-area element 1008 that corresponds with Step 5 (i.e., "Build an Argument").

And while the argument-staging-area element 1008 provides the student with a specific type of argument-building staging area (i.e., workspace) that is described more fully below, indeed the entire "Your Work" view of the content-display pane 512 more generally provides the student user with a designated staging area for multiple types of user work product pertaining to the source-material selection. The example screenshot 1000 corresponds with a time where the student has, for example, completed Step 1 ("Connect") (by entering the displayed text (i.e., "This is some example text, describing a personal experience.") in the text-entry input field 526 of the text-editor element 522 that is displayed in the working-display pane 514, but has yet to complete either Step 4 ("Summarize") or Step 5 ("Engage with the Text").

The above descriptions of FIGS. 5-10 correspond respectively to the various elements of the content-display-pane control panel 508 being selected one by one in descending order according to how they are visually presented. In each of the screenshots of FIGS. 5-9, the working-display pane 514 appeared the same, and then it changed in FIG. 10 when the student user completed Step 1 ("Connect") as described above. It is noted that the text that the student entered in the text-entry input field 526 was auto-populated to the connect element 1004 of the "Your Work" view of the content-display pane 512, as represented by the dashed arrow 1010. It is further noted that this occurs whether or not the "Your Work" view is currently being displayed in the content-display pane 512; that is, if the "Rubric" view was currently displayed at the time the student entered the text into the text-entry input field 526, and the student thereafter clicked on the "(F) Your Work" element in the content-display-pane control panel 508, that entered text would still have been auto-populated to, and thus would appear in, the connect element 1004.

Figure 13:
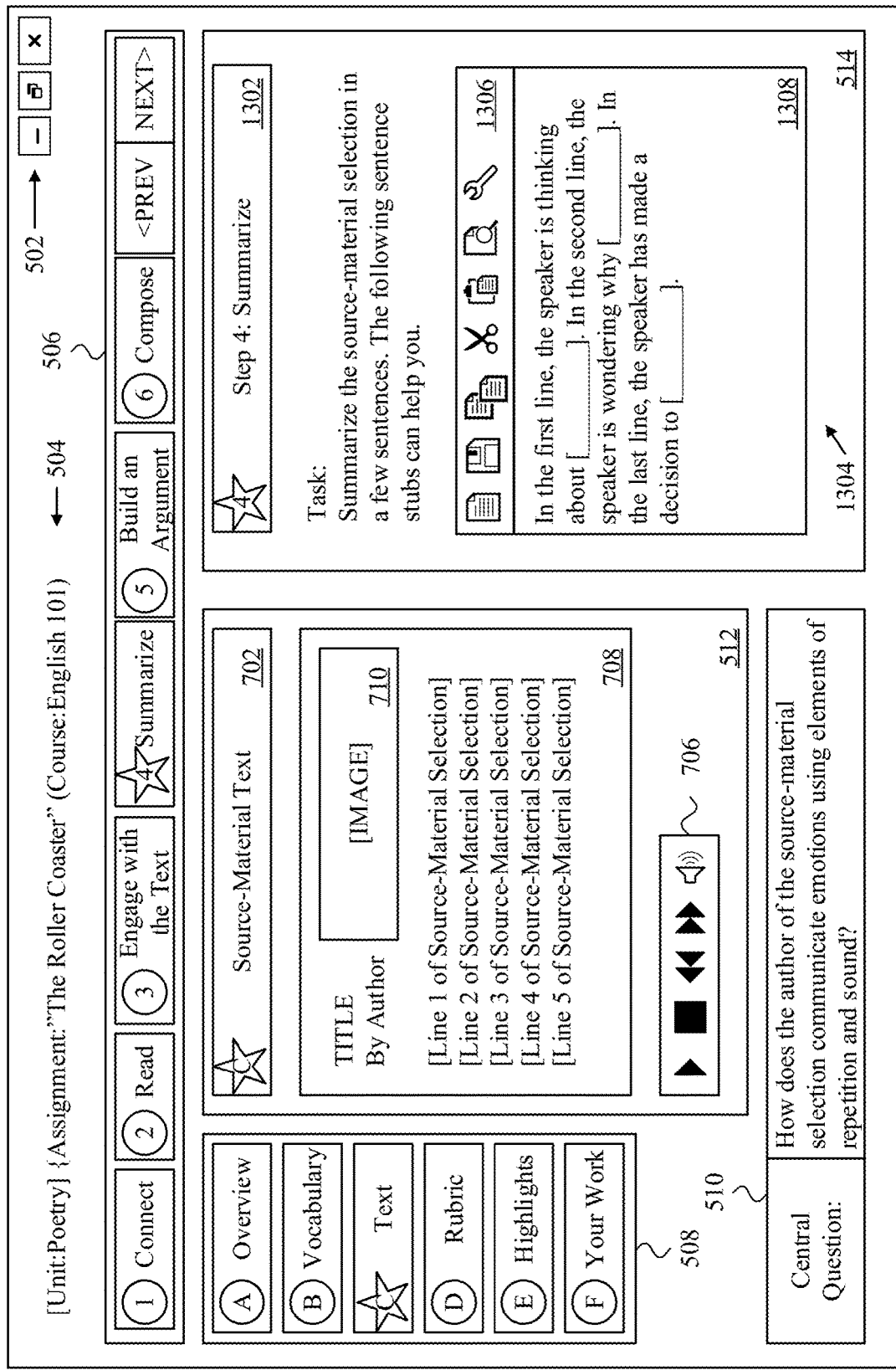
FIG. 13 is a ninth example screenshot of a client-side user interface, in accordance with at least one embodiment.
Figure 14:
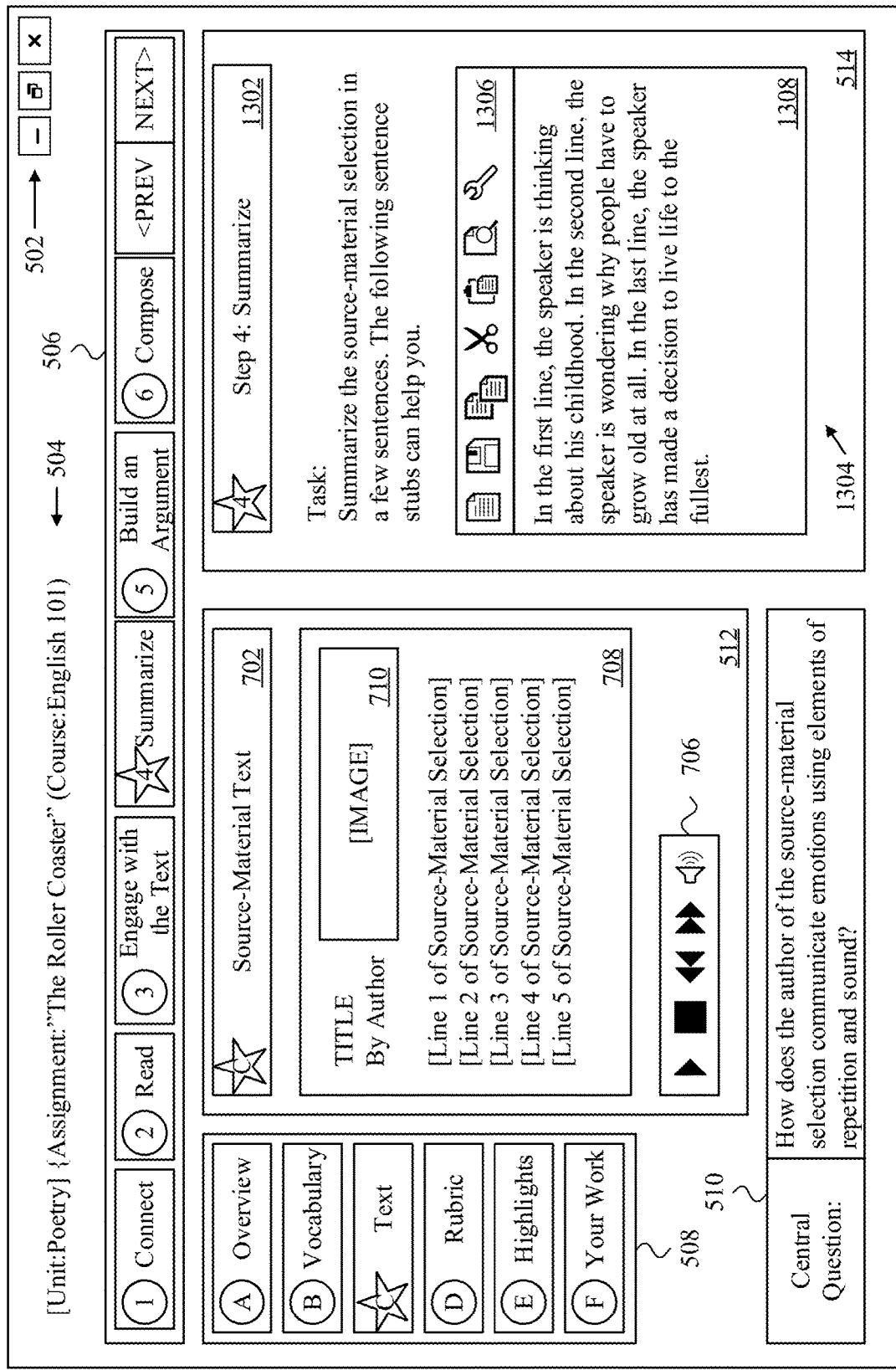
FIG. 14 is a tenth example screenshot of a client-side user interface, in accordance with at least one embodiment.

This series of example screenshots continues below with descriptions of FIGS. 11-14, which pertain to Step 2 ("Read") (FIG. 11), Step 3 ("Engage with the Text") (FIG. 12), and Step 4 ("Summarize") (FIGS. 13-14).

Figure 11:
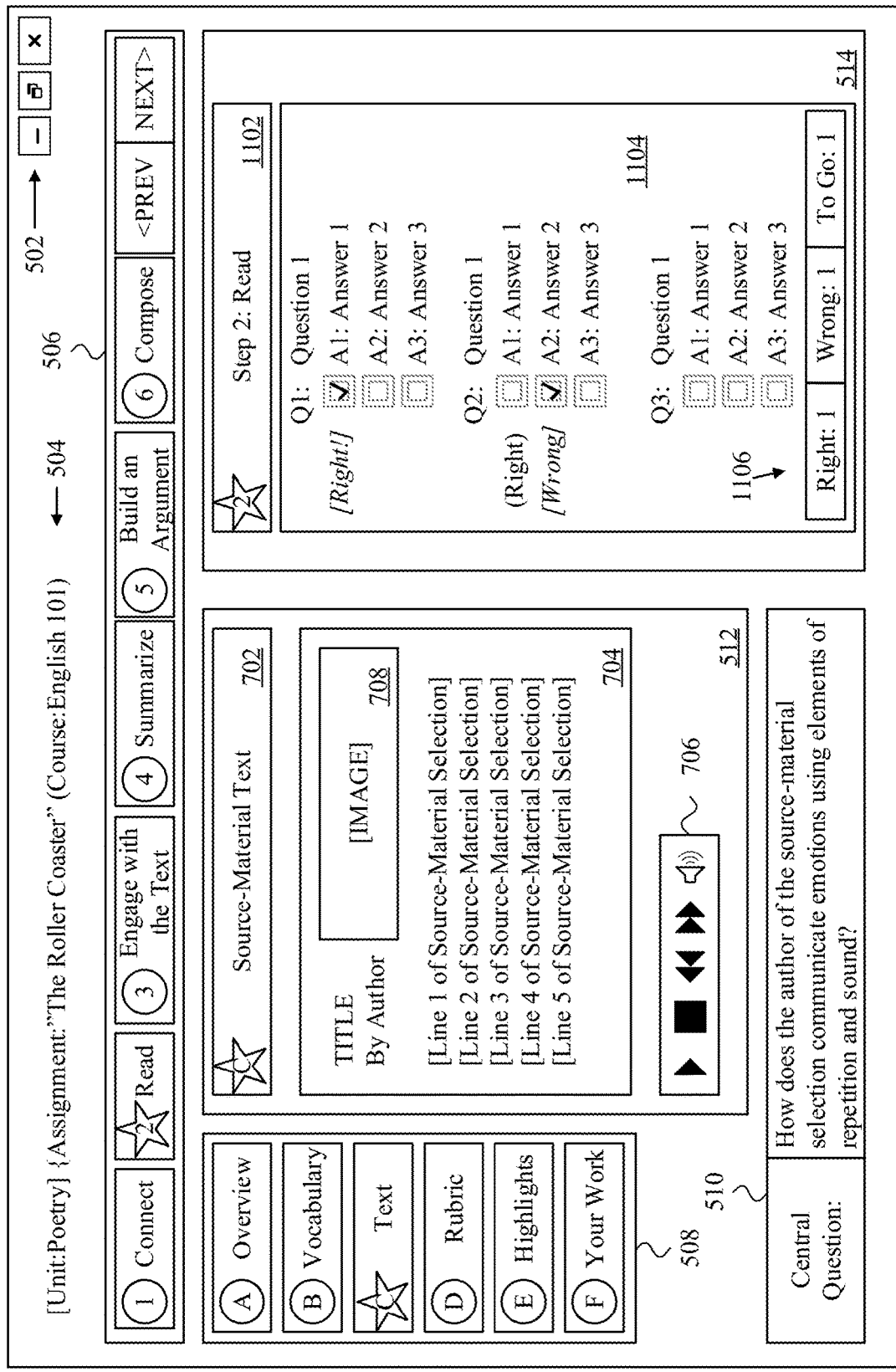
FIG. 11 is a seventh example screenshot of a client-side user interface, in accordance with at least one embodiment.
Figure 12:
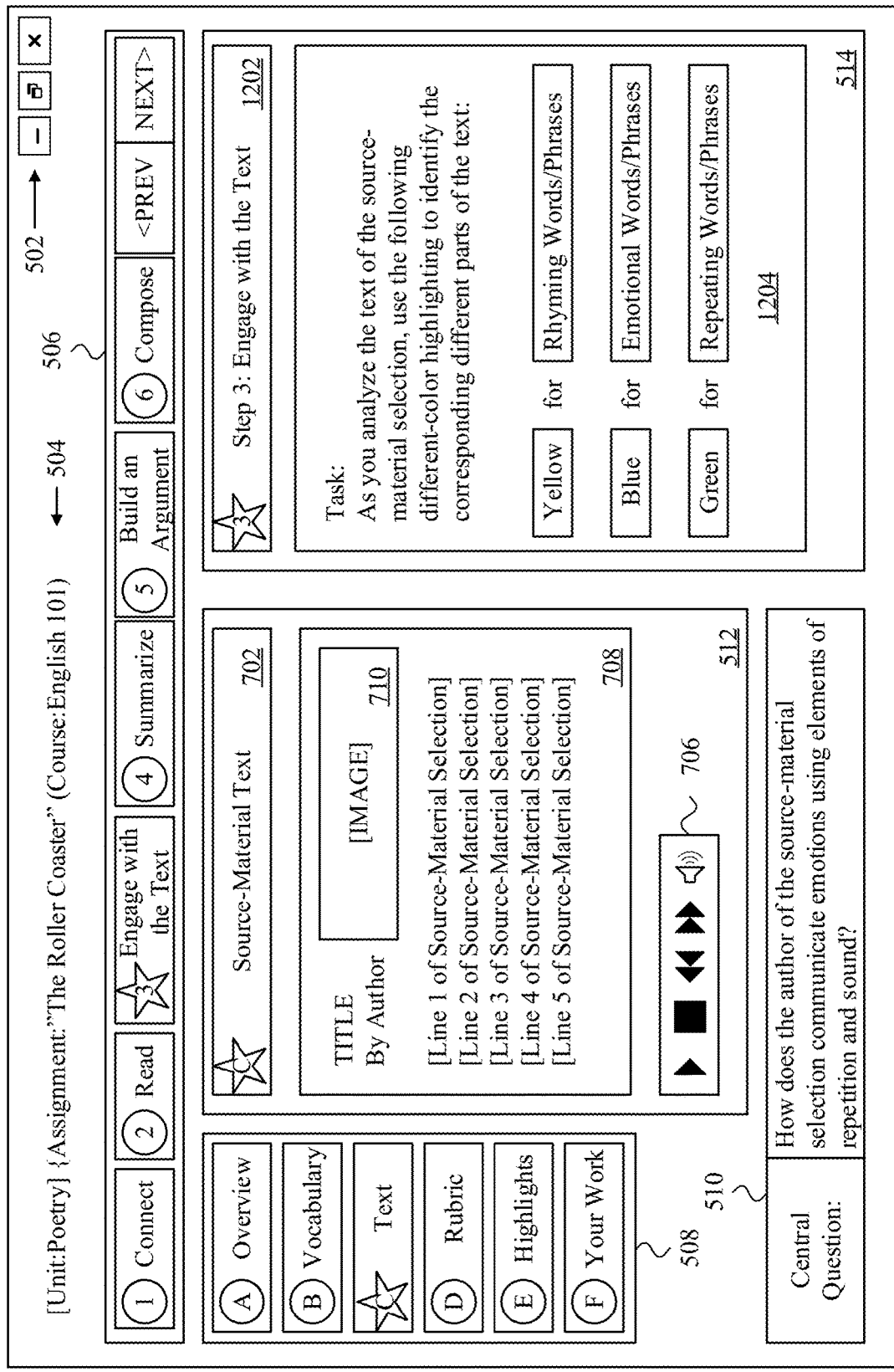
FIG. 12 is an eighth example screenshot of a client-side user interface, in accordance with at least one embodiment.

FIG. 11 depicts an example screenshot 1100 that in at least one embodiment is presented to the student user after the student has clicked (in any order) on the "(B) Vocabulary" element in the content-display-pane control panel 508 and the "(2) Read" element in the working-display-pane control panel 506. This sequence of clicks could have, though need not have, started at a time when the student was viewing the example screenshot 1000 of FIG. 10. Moreover, in at least one embodiment, the student simply clicking on the "(2) Read" element in the working-display-pane control panel 506 results in both the source-material-selection view in the content-display pane 512 and the below-described multiple-choice view in the working-display pane 514.

As a result of that sequence of clicks, the content-display pane 512 displays the source-material-text view that is described above in connection with FIG. 7, and the working-display pane 514 displays a multiple-choice view that includes (i) a working-display-pane header 1102 having a matching starred "2" icon and header text reading "Step 2: Read" and (ii) a multiple-choice-display element 1104 that includes (a) an example set of three multiple-choice questions pertaining to the source-material selection and (b) a realtime-results element 1106. As can be seen in FIG. 11, by way of example, the student has correctly answered the first question, incorrectly answered the second question, and has yet to answer the third question. Some embodiments allow for students to correct initially incorrect answers, while some embodiments do not. Moreover, some embodiments give students a chance to declare their answer as their "final answer," while some embodiments do not. This "Step 2: Read" exercise, which includes some multiple-choice questions (and could certainly instead or in addition include one or more questions or other exercises of one or more other types) is one disclosed way to help the student engage with a given text to a helpful extent prior to, in an embodiment, asking the student to construct (and then assisting the student with constructing) a pertinent argument.

Speaking of engaging with the text, the student may next click on the "(3) Engage with the Text" element in the working-display-pane control panel 506 (and it is noted that in this and other examples described herein, the student may use the "previous" and "next" navigational controls in the working-display-pane control panel 506). This may result in the student being presented with the example screenshot 1200 of FIG. 12. In the screenshot 1200, the content-display pane 512 is still displaying the source-material-text view, while the working-display pane 514 is displaying an engagement view that includes (i) a working-display-pane header 1202 having a matching starred "3" icon and header text reading "Step 3: Engage with the Text" and (ii) a highlight-instruction-display element 1204 that includes some text instructions followed by three example pairs of highlight colors with corresponding types of words/phrases that the student is tasked with locating in the source-material selection and then highlighting with the appropriate color.

As mentioned above, in connection with a given instance of highlighting a given word or phrase, the student has the option of including highlight-specific notes as well. In an embodiment, after highlighting a given word or phrase, the student may be able to right click on the highlighted word or phrase to open a small notepad-like text element into which the student can enter highlight-specific notes. In an embodiment, the "Yellow," "Blue", and "Green" (or whatever colors are chosen for a given implementation) indicators in the highlight-instruction-display element 1204 are selectable by the user to activate an appropriately colored text-highlighting tool. In some embodiments, that sort of right-click functionality to add notes in connection with various specific parts of the source-material selection is provided whether the right-clicked-on text is highlighted or not. And certainly other implementations are possible.

If the student next clicked on—or perhaps used the "next" navigational control to advance to—Step 4 ("Summarize"), the student may then be presented with the screenshot 1300 of FIG. 13, in which the working-display pane 514 includes (i) a working-display-pane header 1302 having a matching starred "4" icon and header text reading "Step 4: Summarize," (ii) textual instructions for this task, and (iii) a text-editor element 1304 that includes a text-editor toolbar 1306 and a text-entry input field 1308. The textual instructions ask the student to summarize the source-material selection in a few sentences, and gives the student the option to use some provided sentence stubs to help get them started. The example screenshot 1400 of FIG. 14 is quite similar to the example screenshot 1300 of FIG. 13, other than that the student has filled in the blanks, thereby turning the provided sentence stubs into complete sentences. The present systems and methods then responsively locally save and perhaps also remotely save that entered text (along with the text that was already there), and also auto-populate the full text of that completed summary into the summarize element 1006.

Figure 15:
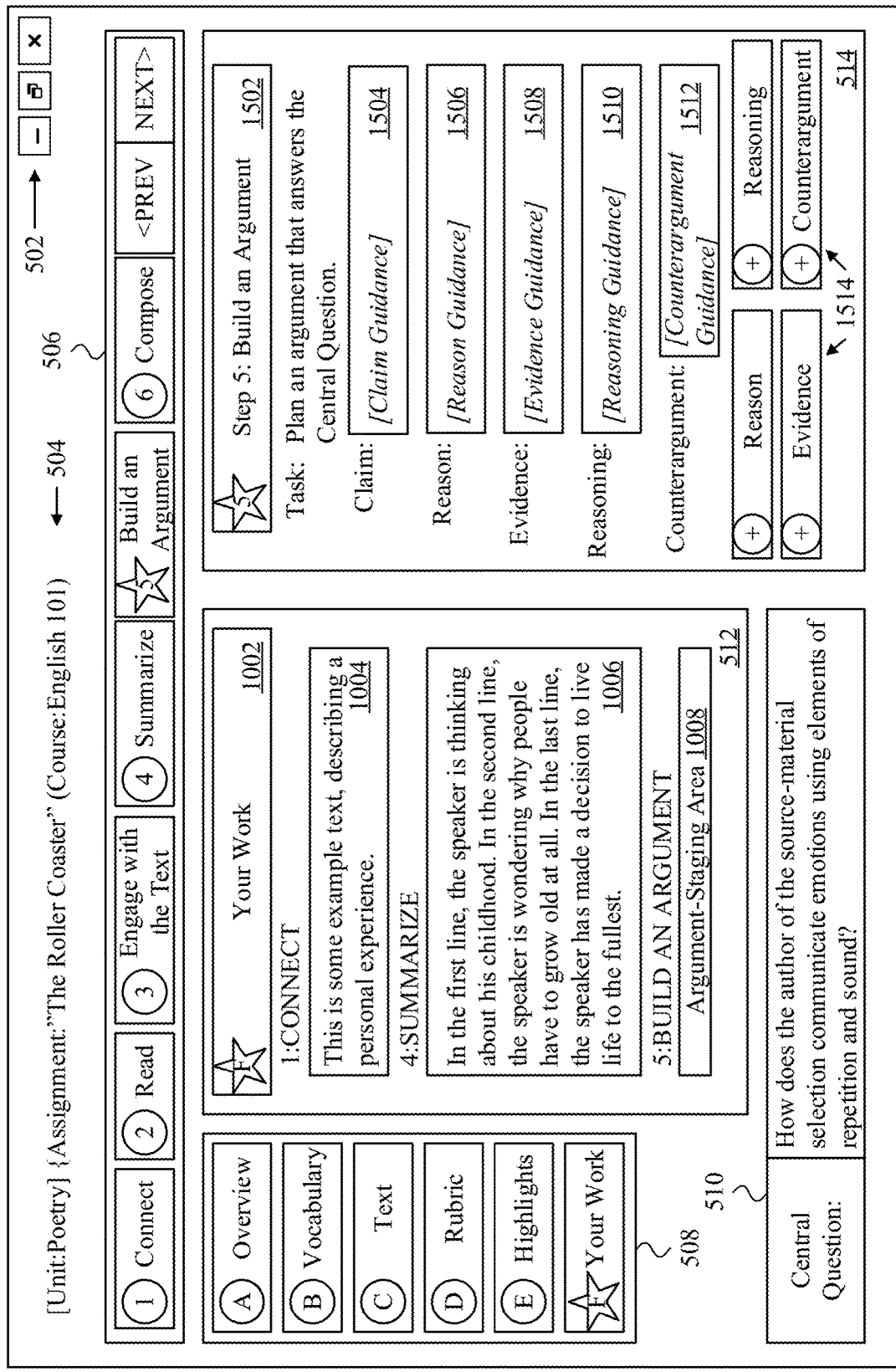
FIG. 15 is an eleventh example screenshot of a client-side user interface, in accordance with at least one embodiment.

If the student next advances to the Step 5 ("Build an Argument") element of the working-display-pane control panel 506, perhaps from the screenshot 1400 of FIG. 14, the student may then be presented with the screenshot 1500 of FIG. 15. In the screenshot 1500, the working-display pane 514 includes (i) a working-display-pane header 1502 having a matching starred "5" icon and header text reading "Step 5: Build an Argument," (ii) a plurality of user-interface input fields (1504-1512), and (iii) an argument-element-adding panel 1514. The plurality of user-interface input fields includes a claim input field 1504, a reason input field 1506, an evidence input field 1508, a reasoning input field 1510, and a counterargument input field 1512. Each of the input fields 1504-1512 may, as in the depicted example, be pre-populated with some helpful text that defines for the student what type of text would be appropriate for the particular input field and/or provides one or more examples of appropriate text for the particular input field. In the example screenshot 1500, that helpful text is what is referenced by the phrases "Claim Guidance," "Reason Guidance," and the like that appear in the respective input fields before the student has entered any text in the respective fields.

If the student wishes at any point in the argument-building process to add an additional input field with the argument-element type set to Reason, Evidence, Reasoning, or Counterargument, the student can simply click on the appropriate element in the argument-element-adding panel 1514, at which point an additional instance of the corresponding type of input field will be added. In an embodiment, students can also delete one or more input fields, perhaps by clicking on an "x" icon as is customary in the art.

In an embodiment, a claim is an overall assertion that the student is making in response to the central question, and thus there would typically only be a single argument element having the argument-element type of Claim. In an embodiment, a reason is a somewhat-summary-level explanation as to why the author is asserting that the claim is correct. In an embodiment, evidence is one or more actual examples from the source-material selection that support the explanation given in the Reason. In an embodiment, the reasoning field may include text where the student is further expounding in more detail regarding why the provided evidence represents support for the corresponding reason. In an embodiment, the counterargument field may be intended for text that lists a reason why the student's claim is wrong in the opinion of some, and also that includes text overcoming that counterargument. And certainly other argument-element types (and composition-element types more generally) could be used in various different implementations.

In an embodiment, the desktop computer 128 then receives textual inputs via the respective user-interface input fields, and responsively presents corresponding argument-building-block elements via the client-side user interface according to a current arrangement on the client-side user interface of the user-interface input fields, where each presented argument-building-block element (i) has the same argument-element type as the corresponding user-interface input field and (ii) includes the textual input received via the corresponding user-interface input field. This is helpfully illustrated by a sequence of screenshots starting with the screenshot 1600 of FIG. 16.

It is noted that, for space concerns, several figures, including FIG. 16 contain fewer elements than the more comprehensive screenshots such as the screenshot 1500 of FIG. 15. Moreover, in figures such as FIG. 16, the user-interface elements that are displayed are often shown having a bigger size than those same elements occupy on the more comprehensive screenshots. This technique of illustration and depiction is not intended to imply that the elements that are depicted in figures such as FIG. 16 include everything that the student user would see. Furthermore, some of the elements in FIG. 16 and others like it, such as the arrows 1644, are presented for illustrative and explanatory purposes in this detailed description, but would not necessarily be actually visible to the student user during operation.

The screenshot 1600 of FIG. 16 corresponds to a time when the student has not yet entered text into any of the input fields 1504-1512. The screenshot 1600 does show, however, that an initially blank argument-building-block element 1602-1610 is provided in the argument-staging-area element 1008 in correspondence with each of the respective input fields 1504-1512. The argument-building-block element 1602 includes an argument-element-type indication 1612 that indicates that the type is Claim, a copy-to-composition button 1622, and a text-display space 1632. The argument-building-block element 1604 includes an argument-element-type indication 1614 that indicates that the type is Reason, a copy-to-composition button 1624, and a text-display space 1634. The argument-building-block element 1606 includes an argument-element-type indication 1616 that indicates that the type is Evidence, a copy-to-composition button 1626, and a text-display space 1636. The argument-building-block element 1608 includes an argument-element-type indication 1618 that indicates that the type is Reasoning, a copy-to-composition button 1628, and a text-display space 1638. The argument-building-block element 1610 includes an argument-element-type indication 1620 that indicates that the type is Counterargument, a copy-to-composition button 1630, and a text-display space 1640.

The arrows 1644 indicate the one-to-one correspondence between the respective input fields 1504-1512 and the corresponding respective argument-building-block elements 1602-1610. The argument-staging-area element 1008 also includes a copy-all-to-composition button 1642, which is discussed more fully below, but in general the copy-all-to-composition button 1642 operates as if each of the individual copy-to-composition buttons 1622-1630 were actuated in the order displayed.

The screenshot 1700 of FIG. 17 shows that when the student enters some text into the claim input field 1504, that text is saved by the system and auto-populated into the text-display space 1632 of the corresponding argument-building-block element 1602. In some instances, the system, responsive to receiving text via a given input field, fills data in with respect to an already-created blank argument-building block element; in other instances, the system, still responsive to receiving text via a given input field, generates a given argument-building-block element only once the text has been entered and/or saved. The screenshots 1800-2100 of FIGS. 18-21 show in succession a sequence where the student enters text into the input fields 1506-1512. Similar to how the system auto-populated the text entered in the claim input field 1504 into the argument-building-block element 1602, the system populates the text entered into the input fields 1506-1512 into the respective text-display spaces 1634-1640 of the respective argument-building-block elements 1604-1610.

Moreover, it is noted that manual text entry into input fields such as the input fields 1504-1512 is not the only way that argument-building-block elements can be generated and presented. In some embodiments, the highlighting of text as part of Step 3 ("Engage with the Text") causes corresponding argument-building-block elements to be generated that contain the highlighted text and that may have the argument-element type equal to Evidence. In other embodiments, once some text is highlighted in the source-material selection, the student may be able to right click and/or enter some other user-interface command to cause a corresponding argument-building-block element to be created in the argument-staging-area element 1008. It can be seen in FIG. 21 for example that the presented argument-building-block elements 1602-1610 may have the appearance of respective index cards. In some embodiments, this visual presentation could be further enhanced by including graphics such as red and/or blue horizontal lines on the graphical index cards. And certainly other example implementations are possible.

Figure 22:
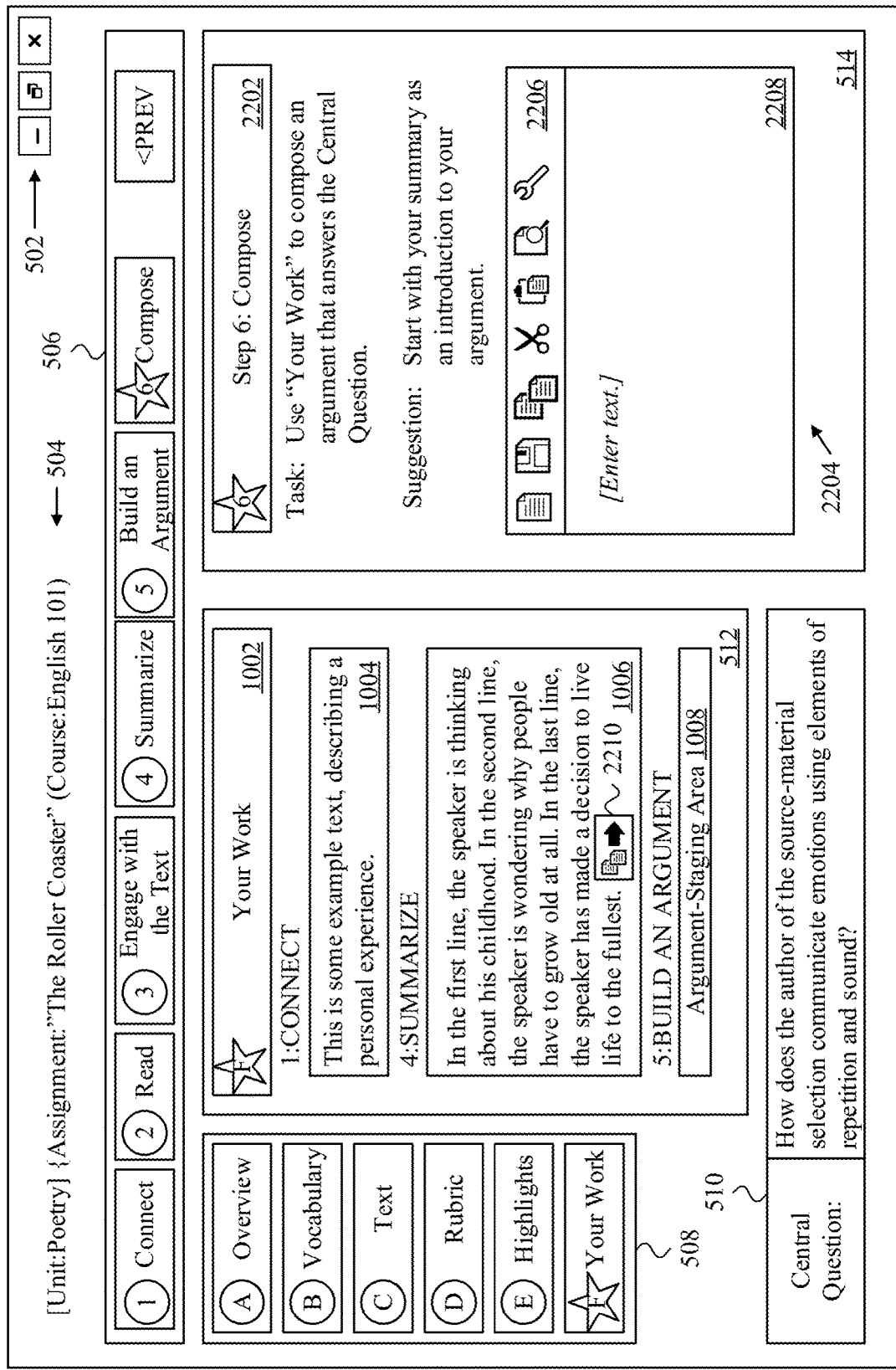
FIG. 22 is an eighteenth example screenshot of a client-side user interface, in accordance with at least one embodiment.
Figure 24:
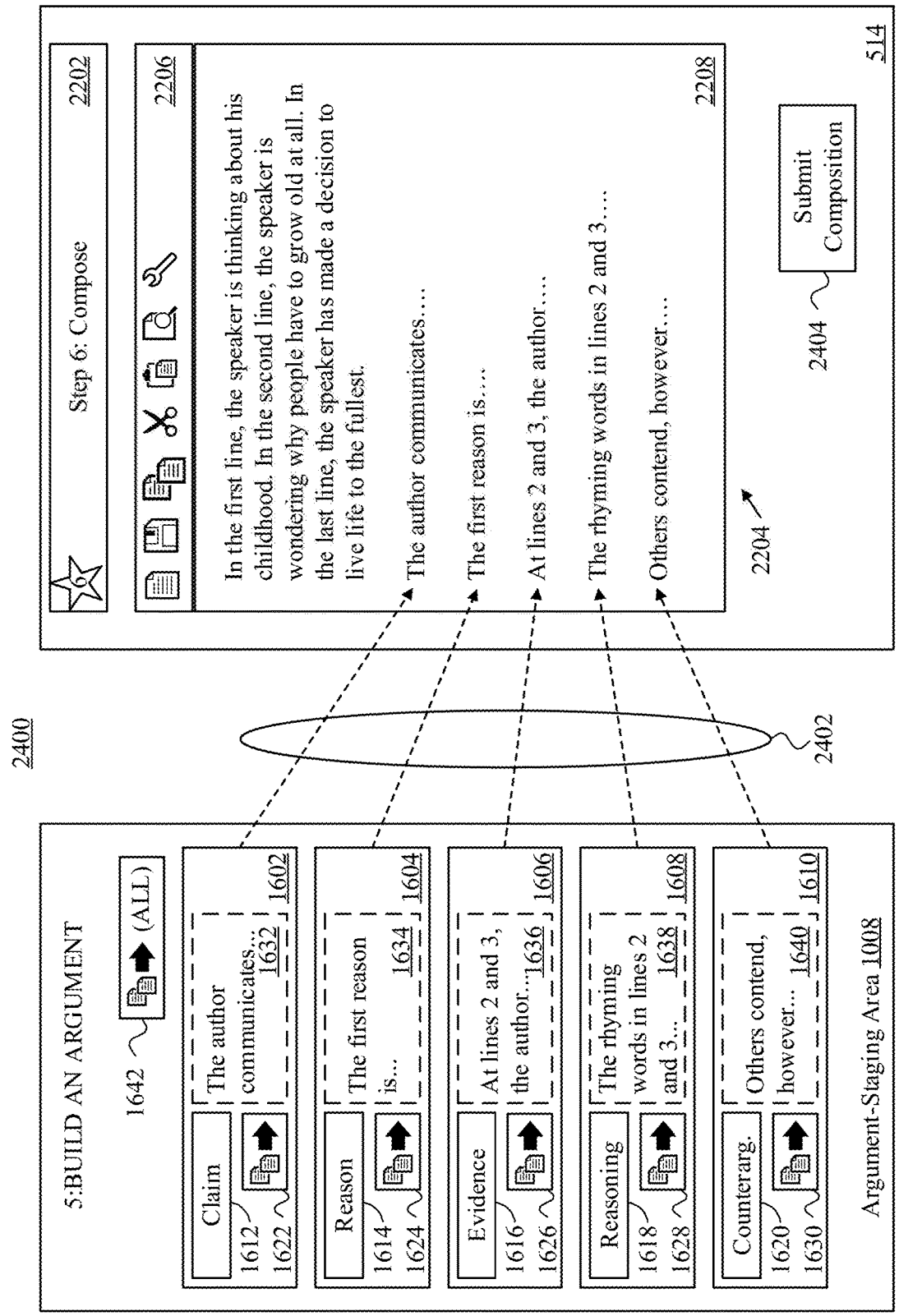
FIG. 24 is a twentieth example screenshot of a client-side user interface, in accordance with at least one embodiment.

The example screenshot 2200 of FIG. 22 may correspond to the student having completed Step 5 ("Build an Argument") and then advanced the working-display-pane control panel 506 such that Step 6 ("Compose") is then selected. This results in the working-display pane 514 displaying (i) a working-display-pane header 2202 that includes a matching starred "6" icon and the header text "Step 6: Compose," (ii) textual task instructions, (iii) some suggestion text, and (iv) a text-editor element 2204 that includes a text-editor toolbar 2206 and a text-editing space 2208. The task instructions direct the student to use the organized argument elements that the student by now has stored in their "Your Work" space to compose/construct an argument that is responsive to the central question. The suggestion text recommends to the student that they start their argument with the summary that they created in Step 4 ("Summarize"). In the depicted embodiment, once the student has advanced to having Step 6 ("Compose") be displayed in the working-display pane 514, a copy-to-composition button 2210 is displayed in the summarize element 1006 of the your-work view that is being displayed in the content-display pane 512. The screenshot 2300 of FIG. 23, by way of the arrow 2302, graphically depicts that when the student actuates the copy-to-composition button 2210, the text from the summarize element 1006 is auto-populated into the text-editing space 2208.

In some embodiments, the system enables the student, when working on Step 5 ("Build an Argument"), to reorder (e.g., by drag and drop) the input fields 1504-1512 and/or the argument-building-block elements 1602-1610. Upon receiving such reordering input with respect to the input fields 1504-1512, the system responsively reorders the corresponding argument-building-block elements 1602-1610 in the same manner. Similarly, upon receiving reordering input with respect to the argument-building-block elements 1602-1610, the system responsively reorders the corresponding input fields 1504-1512 in the same manner.

Moreover, the system in some embodiments permits linking of sequential input fields 1504-1512 and/or argument-building-block elements 1602-1610. The student may link such elements by highlighting multiple elements, by using a "Control+Click" command as is known in the art, a right click, and/or any other suitable user-interface interaction by which a student could indicate that two or more sequential input fields 1504-1512 or two or more sequential argument-building-block elements 1602-1610 should be linked. Such linking relationships may also be able to be undone by the user. Moreover, in at least one embodiment, any reordering of input fields 1504-1512 and/or argument-building-block elements 1602-1610 would keep any then-current linking relationships intact. Moreover, in some embodiments, a copy-to-composition command entered with respect to any argument-building-block element 1602-1610 in a linked relationship would apply to all argument-building-block elements in the linked relationship (e.g., by auto-populating into the composition their respective text, concatenated in the linked order). And certainly other implementations are possible as well.

The desktop computer 128 may thereafter receive, via the client-side user interface, argument-building selections of one or more of the presented argument-building-block elements, and responsively generate a composition in a displayed text editor at least in part by populating the textual inputs into the displayed text editor according to the received argument-building selections. One example of this is illustrated in the example screenshot 2400 of FIG. 24. There it can be seen that the argument-building-block elements 1602-1610 have the text in them from Step 5 ("Building an Argument"). The arrows 2402 depict that actuation of the copy-to-composition buttons 1622-1630 in an order of how they are displayed from top to bottom results in the corresponding text in the corresponding text-display spaces 1632-1640 of the argument-building-block elements 1602-1610 being copied over to the text-editing space 2208. Now that the student is working on Step 6 ("Compose"), a submit-composition button 2404 is displayed in the working-display pane 514 below the text-editor element 2204. It is noted that, in this described example, the submit-composition button 2404 has not yet been actuated.

It is further noted that the above-described argument-building selections could take the form of respective actuations (e.g., respective single clicks or respective double clicks) of the copy-to-composition buttons 1622-1630, though they could also take the form of actuation of the copy-all-to-composition button 1642. In other embodiments, the student user is able to drag and drop text from the argument-staging-area element 1008 to the text-editing space 2208. And certainly numerous other possible implementations could be listed here as well. Moreover, as is shown in the example screenshot 2500 of FIG. 25, the student user in at least one embodiment can further edit the text after it has been populated into the text-editor element 2204. In the screenshot 2500, the student has edited the separately populated sentences into more of a conventional paragraph form; and certainly other types of edits and formatting changes could be carried out as well.

The desktop computer 128 may thereafter submit the generated composition for evaluation. In an embodiment, such a step is carried out as a result of the client-side user interface detecting actuation of the submit-composition button 2404. In an embodiment, the generated composition is transmitted from the desktop computer 128 to the server 102 in, for example, an HTTP message. In some embodiments, and as is more fully described below, the client-side user interface that is being executed by the desktop computer 128 in this example iteratively saves the generated composition to the server 102. In such examples, a function such as submitting a generated composition (or entire assignment, or any other subpart) may simply involve transmitting a message to the server 102 to indicate that the iteratively saved work has been deemed submitted for evaluation. In some embodiments, evaluation is or at least includes grading in an educational context.

It can happen that educational institutions experience intermittent Internet connectivity. This is addressed at least in part in some embodiments by the client-side user interface monitoring (e.g., with polling messages, keep-alive messages, and/or the like) the presence and absence of connectivity to the server 102. In some such embodiments, the client-side user interface operates in a local-saving mode during absence of connectivity and instead operates in a remote-saving mode during presence of connectivity.

In some embodiments, the issue of educational institutions experiencing intermittent Internet connectivity is addressed at least in part by the carrying out by the desktop computer 128 of the remaining steps (i.e., the steps 404-412) of the method 400 of FIG. 4A. These remaining steps are described below, often using examples from the above-presented description of the screenshots 500-2500 of FIGS. 5-25 for illustration. Prior to proceeding with that description, the reader is reminded that, at step 402 of the method 400 of FIG. 4A, the desktop computer 128 began presenting a student assignment via the client-side user interface.

At step 404, the desktop computer 128 receives student input via the client-side user interface in connection with the student assignment that the desktop computer began presenting at step 402, and responsively locally stores the received student input.

The student input that the desktop computer 128 receives at step 404 could include free-text input. One example of this is shown in and described in connection with the screenshot 1000 of FIG. 10, which depicts some example free-text input being received via the text-entry input field 526 of the text-editor element 522 of the working-display pane 514. Another example is shown in and described in connection with the screenshot 1400 of FIG. 14, which depicts some example free-text input being received via the text-entry input field 1308 of the text-editor element 1304 of the working-display pane 514. Further examples are shown in and described in connection with the screenshots 1700-2100 of FIGS. 17-21 with respect to the user-interface input fields 1504-1512 of the working-display pane 514. Yet another example is shown in and described in connection with the screenshot 2500 of FIG. 25, which depicts some example free-text input (i.e., editing) being received via the text-editing space 2208 of the text-editor element 2204 of the working-display pane 514. And certainly numerous other examples could be described as well.

The student input that the desktop computer 128 receives at step 404 could include multiple-choice-selection input. One example of this is shown in and described in connection with the screenshot 1100 of FIG. 11, which depicts some example multiple-choice-selection input being received via the multiple-choice-display element 1104 of the working-display pane 514. And certainly numerous other examples could be described as well.

The student input that the desktop computer 128 receives at step 404 could include highlighting input with respect to a presented source-material selection. One example of this is shown in and described in connection with the screenshot 1200 of FIG. 12, which depicts some example highlighting input being requested via the highlight-instruction-display element 1204 of the working-display pane 514 with respect to the source-material selection that is presented in the embedded image 708 of the content-display pane 512. And certainly numerous other examples could be described as well.

In at least one embodiment, and regardless of the one or more forms that the received student input takes, the desktop computer 128 may locally store the received student input in a memory of the client-side computing device. Some examples that such a memory could take are described above in connection with the client-device data storage 308 that is shown in and described in connection with FIG. 3. In different embodiments, the desktop computer 128 locally stores student input in response to any change, any student input being received, a periodic timer expiring during which at least some student input was received, and/or according to one or more different approaches deemed suitable by those of skill in the art for a given implementation.

Moreover, the manner in which the desktop computer 128 locally stores the received student input can take different forms as well. In at least one embodiment, the desktop computer 128 updates the state of the client-side models (e.g., the studentAssignment model and the studentResponse model that are further discussed below) and saves that updated state. In some embodiments, the desktop computer 128 locally stores the received student input using what is known in the art as localStorage. In other embodiments, the desktop computer 128 does not use localStorage to store the received student input. As known in the art of web programming, localStorage is a local storage location (e.g., a data file) that is somewhat akin to cookies though often less accessible than cookies are to the typical user. And certainly other example implementations of storing received student input locally (i.e., on the client-side computing device in some manner) could be listed here.

In some embodiments, the executing client-side user interface maintains status indicators respectively for different user-input fields. As is described above and as is known in the art, the client-side user interface may initialize each such status indicator to a clean state. Upon receiving student input in connection with a given user-input field while the status indicator for that field is in the clean state, the client-side user interface changes the respective status indicator to the dirty state. Further processing is described below.

As mentioned, in at least one embodiment, the client-side user interface is realized at least in part by runtime execution of a JavaScript codebase on a client-side computing device such as the desktop computer 128. As also mentioned, that JavaScript codebase could have an MVC architecture such as the one that is shown in and described in connection with FIG. 4B. That MVC architecture could define a model that is referred to herein as a studentAssignment model to correspond with an overall student assignment such as the example assignment that is described above in connection with FIGS. 5-25. That assignment involved a number of different steps that are referred to in that description as Steps 1-6.

Figure 26:
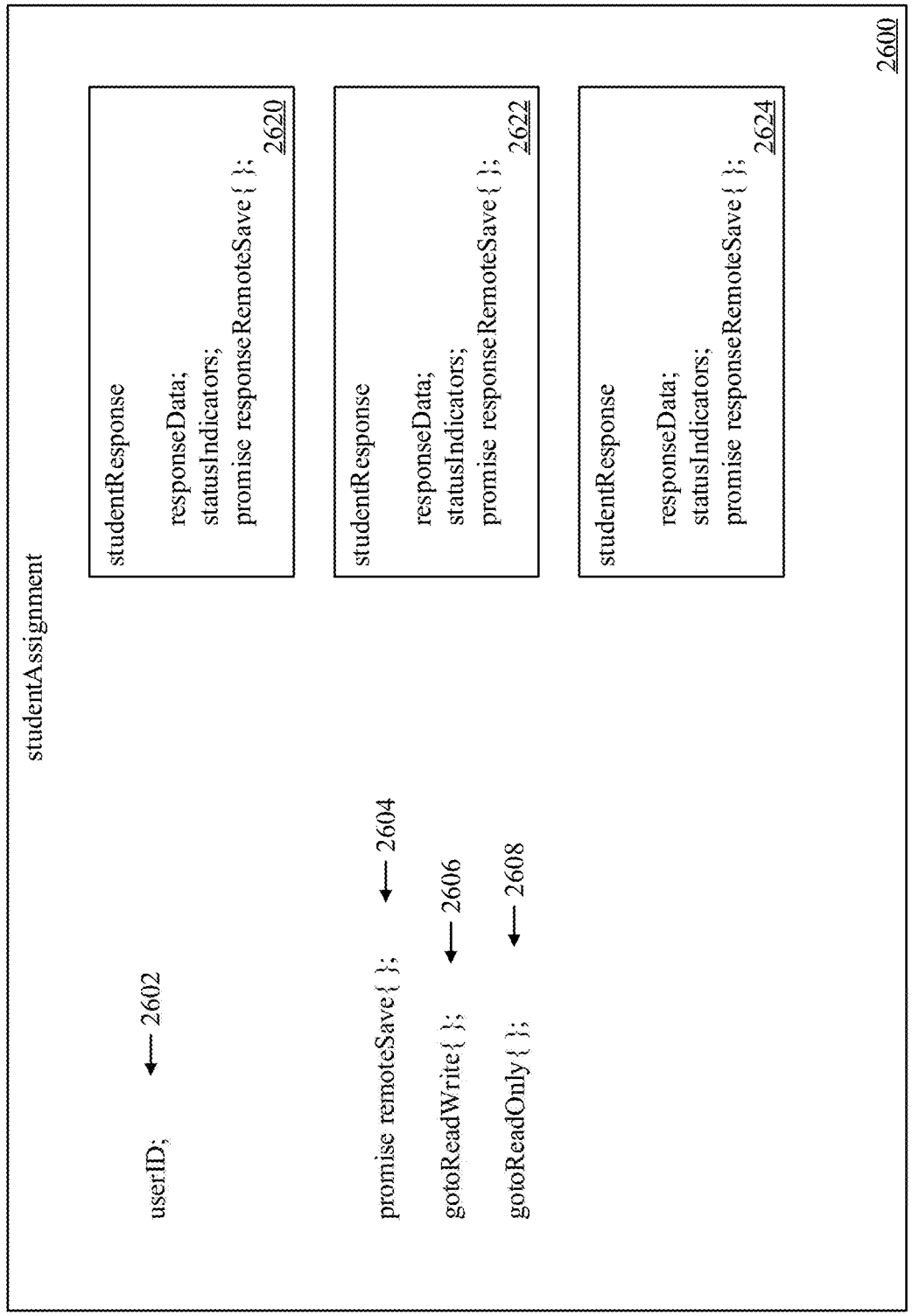
FIG. 26 depicts an example studentAssignment model, in accordance with at least one embodiment.

An example diagram of an example studentAssignment model is depicted in FIG. 26, which shows an example studentAssignment model 2600. This figure is meant to be conceptual in nature and will be understood by those in the programming arts as representing more concrete object-oriented-programming (OOP) objects, concepts, and data structures. By way of example, FIG. 26 shows the studentAssignment model 2600 having one data element: a userID element 2602, which could be an alphanumeric identifier for a given student user. And of course the studentAssignment model 2600 could and likely would define a number of other data elements as well. Moreover, the studentAssignment model 2600 defines three different methods by way of example: a remoteSave method 2604, a gotoReadWrite method 2606, and a gotoReadOnly method 2608. Other methods could be defined as well as part of the studentAssignment model 2600. Lastly, the studentAssignment model 2600 includes a set of three child studentResponse models 2620-2624. Each of these may correspond to an assignable and assessable task such as each of the Steps 1-6 described above. Thus, while only three child studentResponse models 2620-2624 are depicted in FIG. 26, some embodiments include six; other embodiments include other numbers of them. At least one embodiment includes none.

Each child studentResponse model 2620-2624 includes a respective responseData data element and a respective statusIndicators data element, and each also includes a respective responseRemoteSave method, which is further described below. Each studentResponse model 2620-2624 may receive student input in connection with its particular respective assignable and assessable task. Thus, if the studentResponse model 2620 corresponded with "Step 1: Connect" as described above, it may be the studentResponse model 2620 that receives the free-text input and locally stores (or manages local storage of) that received free-text input using its respective responseData data element. Moreover, the studentResponse model 2620 may maintain the dirty and clean status of its one or more data fields using its respective statusIndicators data element.

To continue the example, the studentResponse model 2622 may correspond with Step 2 ("Read") as described above. In that case, the studentResponse model 2622 may receive the multiple-choice input and store that input in is respective responseData data element, and may similarly maintain the dirty and clean status of its one or more data fields using its respective statusIndicators data element.

As another example, the studentResponse model 2624 may correspond with Step 5 ("Build an Argument") as described above. As such, the studentResponse model 2624 may be more internally complex than either the studentResponse model 2620 or the studentResponse model 2622. Indeed, the studentResponse model 2624 may use its respective responseData data element to store the number of argument-building blocks that a student currently has deployed, the order of those blocks, the content of those blocks, any linking with respect to those blocks, and/or any other data that might be received by the studentResponse model 2624 as the student user does their work. The studentResponse model 2624 may use its respective statusIndicators data element to store the dirty or clean status of each of its one or more data fields. It is noted that this status could be maintained as a 0 or a 1, a false or a true, or using some other data-storage convention.

At step 406, the desktop computer 128 detects what is referred to in this disclosure as a remote-save-triggering event, and responsively executes what is referred to in this disclosure as a remote-save method, which attempts to save the locally stored student input to the server 102. In this example, the remote-save method is the remoteSave method 2604. As shown in FIG. 26, the type of return value for the remoteSave method 2604 is what is known in JavaScript programming as a promise. In accordance with the present systems and methods, the remoteSave method 2604 returns either a remote-save-success promise or a remote-save-failure promise. The remote-save-success promise and remote-save-failure promise could be defined data types, numerical values, Boolean data values, and/or any other programming construct deemed suitable by those of skill in the art for a given implementation.

In at least one embodiment, at least one instance of a remote-save-triggering event takes the form of an expiration of a remote-save-triggering timer. That is, the client-side user interface may repeatedly reset a timer, where each time that timer expires is considered to be a remote-save-triggering event. Thus, in some embodiments, the remoteSave method 2604 is invoked periodically. This could be to the exclusion of or in addition to other types of remote-save-triggering events. Moreover, regardless of the form of the save-triggering event, the locally saved student input that the client-side user interface attempts to save during a given invocation of the remoteSave method 2604 could be all of the student's work to date, or could instead be incremental student work that has been locally saved since a prior successful invocation of the remoteSave method 2604. And certainly other example implementations could be listed as well.

In at least one embodiment, at least one instance of detecting a remote-save-triggering event involves detecting the remote-save-triggering event via the client-side user interface. In at least one embodiment, at least one instance of a remote-save-triggering event includes what is referred to herein as a focus-change event. This could take the form of the student closing a user-interface element, hiding (e.g., minimizing) a user-interface element, and/or switching from one user-interface element to another. One example of the latter case might involve detecting that the student has modified a first user-interface element and then selected (e.g., clicked on) a second (i.e., different) user-interface element; another example might involve detecting that the student has modified a first user-interface element and then actually also modified a second (i.e., different) user-interface element. In some embodiments, a remote-save-triggering event takes the form of or at least includes detecting that the student has reordered two or more elements (e.g., input fields 1504-1512 or argument-building-block elements 1602-1610). And certainly other examples could be listed as well.

In at least one embodiment, the remoteSave method 2604 causes each child studentResponse model 2620-2624 to execute its respective responseRemoteSave method, each of which returns either a studentResponse-model-specific remote-save-success promise or a studentResponse-model-specific remote-save-failure promise. Thus, upon execution of the remoteSave method 2604, the child studentResponse model 2620 may execute its respective responseRemoteSave method and return to its parent studentAssignment model 2600 either a success or failure promise that is specific to that child studentResponse model, and is thus referred to in this description as being either a studentResponse-2620-success promise or a studentResponse-2620-failure promise.

Moreover, the studentResponse model 2622 would execute its respective responseRemoteSave method and return to the same parent studentAssignment model 2600 either a studentResponse-2622-success promise or a studentResponse-2622-failure promise. Likewise, the studentResponse model 2624 would execute its respective responseRemoteSave method and return to the same parent studentAssignment model 2600 either a studentResponse-2624-success promise or a studentResponse-2624-failure promise.

In an embodiment, the remoteSave method 2604 of the parent studentAssignment model 2600 returns a studentAssignment-2600-success promise only if each and every one of its child studentResponse models 2620-2624 returned a respective studentResponse-model-specific remote-save-success promise, and instead the remoteSave method 2604 of the parent studentAssignment model 2600 returns a studentAssignment-2600-failure promise when at least one of its child studentResponse models 2620-2624 returned a respective studentResponse-model-specific remote-save-failure promise.

As far has how a given child studentResponse model (child studentResponse model 2620, for example) executes its respective studentResponse-model-specific remote-save method, in some embodiments the child studentResponse model 2620 (i) determines from its respective statusIndicators data element whether it has any input fields in the dirty state or whether all of them are clean; (ii) returns a studentResponse-2620-success promise if they are all clean; and (iii) executes its own attempt protocol to attempt to save the updated student input to the server 102 if it has at least one dirty input field. The studentResponse model may attempt to save all of its input fields or just the dirty ones, in different embodiments. Its attempt protocol may include multiple attempts if necessary, perhaps separated by predetermined time periods that may progressively increase in duration according to a backoff algorithm. If the attempt protocol succeeds, the studentResponse model 2620 returns a studentResponse-2620-success promise from its respective responseRemoteSave method; if not, the studentResponse model 2620 returns a studentResponse-2620-failure promise from its respective responseRemoteSave method. And certainly other example implementations could be listed here as well. Upon success, the studentResponse model 2620 may update its statusIndicators data element to reflect that all of its one or more input fields are clean.

Above was described an embodiment in which, the studentAssignment model 2600 instructs each of its child studentResponse models 2620-2624 to save their work, regardless of their internal dirty or clean state. In other embodiments, the studentAssignment model 2600 maintains its own status data regarding the clean or dirty state of each of its child studentResponse models, and then only instructs those in the dirty state to carry out their respective responseRemoteSave method. And other implementations are possible as well. Moreover, the top-level (i.e., studentAssignment-model-level) remoteSave method 2604 may include its own retry protocol as well, perhaps with backoff time periods as well.

In at least one embodiment, the client-side JavaScript codebase also defines a studentAssignment view. In at least one such embodiment, presenting the student assignment via the client-side user interface includes presenting data from the studentAssignment model 2600 according to the studentAssignment view. In at least one other such embodiment, it is the studentAssignment view that detects the remote-save-triggering event.

At step 408, the desktop computer 128 determines whether the remoteSave method 2604 of the studentAssignment model returned a success promise or a failure promise. If it was a success promise, the desktop computer 128 executes the below-described step 410. If it was a failure promise, the desktop computer 128 executes the below-described step 412. It is also noted that, prior to ultimately returning either a success or failure promise, the remoteSave method 2604 may first return one or more "pending" promises, indicating that the remoteSave method is trying to save the student's work.

At step 410, the desktop computer 128 continues to operate the client-side user interface in the read/write mode, i.e. in a mode in which the student user is able to enter new input and modify input that has already been entered.

At step 412, the desktop computer 128 transitions to operating the client-side user interface in a read-only mode, i.e. in a mode in which the student user is not able to enter new input or modify input that has already been entered. The client-side user interface may present an indication to the student user that this has occurred. Also, one or more input fields may be grayed out and/or otherwise indicated as having been disabled. This step may be carried out by calling a method such as the example gotoReadOnly method 2608. After a predetermined time period, the remoteSave method 2604 may be called again. This may occur any number of times deemed suitable by those of skill in the art for a given implementation. Upon success, the client-side user interface may transition back to the read/write mode, perhaps by calling the example method gotoReadWrite 2606. After transitioning back to the read/write mode, the client-side user interface may submit the student assignment to the server 102 for evaluation.

Moreover, an embodiment may take the form of an educational platform that includes an instantiable client-side user interface such as any embodiment of the client-side user interface described herein, and that also includes the server 102. The client-side user interface has a JavaScript MVC architecture that includes at least one client-side model object, at least one client-side view object, and at least one client-side controller object. The server 102 has a server-side JavaScript MVC architecture that includes at least one server-side model object, at least one server-side view object, and at least one server-side controller object. In this embodiment, the server 102 is programmed to (i) operate the server-side MVC architecture and (ii) instantiate the client-side user interface on a client-side computing device such as the desktop computer 128. In this embodiment, the at least one client-side model object includes a studentAssignment model that corresponds to a student assignment. Moreover, the at least one client-side view object includes a studentAssignment view for presentation of the studentAssignment model. The studentAssignment view is operable in a number of different modes including a read/write mode and a read-only mode. In this embodiment, the desktop computer is configured to (i) receive the client-side user interface from the server 102; (ii) store the received client-side user interface in data storage; and (iii) execute the received and stored client-side user interface. Moreover, in this embodiment, the client-side user interface, when being executed by the desktop computer 128, is configured to carry out the above-described method 400 of FIG. 4A.

In at least one such embodiment, the client-side user interface utilizes a static-URL implementation for presenting the student assignment. In at least one such assignment, the static-URL implementation utilizes asynchronous (e.g., Asynchronous JavaScript and Extensible Markup Language (XML) (AJAX)) messaging for attempting to save the locally stored student input to the server. And certainly other possible implementations could be listed here as well.

What is claimed is:

1. A method comprising:
presenting a student assignment on a client-side user interface of an educational platform via execution of a codebase on a client-side computing device by presenting, in a view, data from a studentAssignment model provided by the codebase, the studentAssignment model comprising a plurality of studentResponse models corresponding to respective assessable tasks associated with the presented student assignment;

initially operating the client-side user interface in a read/write mode;

receiving user input associated with an argument-building-block studentResponse model from the plurality of studentResponse models, the argument-building-block studentResponse model having a status parameter and a responseData element for storing data associated with a set of argument-building-block elements, the data including at least (i) an ordering of the argument-building-block elements, and (ii) text content of the argument-building-block elements received via a corresponding set of argument input fields;

responsive to receiving the user input associated with the argument-building-block studentResponse model, changing the status parameter from a clean state to a dirty state;

detecting a remote-save-triggering event, and responsively executing a remote-save method that attempts to save the received user input to a remote server, wherein the remote-save method returns either a remote-save-success promise or a remote-save-failure promise;

continuing to operate the client-side user interface in the read/write mode and changing the status parameter from the dirty state to the clean state if the remote-save method returns a remote-save-success promise; and transitioning to operating the client-side user interface in a read-only mode if the remote-save method returns a remote-save-failure promise.

2. The method of claim 1, wherein presenting the student assignment via the client-side user interface comprises presenting the student assignment via a web browser that is executing on a client-side computing device, the method further comprising locally storing the received user input in a memory of the client-side computing device.

3. The method of claim 1, wherein the remote-save-triggering event comprises an expiration of a remote-save-triggering timer.

4. The method of claim 1, wherein detecting the remote-save-triggering event comprises detecting the remote-save-triggering event via the client-side user interface.

5. The method of claim 1, further comprising:
downloading the codebase to the client-side computing device from the remote server, wherein:
the codebase has a model-view-controller (MVC) architecture;
the codebase defines the studentAssignment model that corresponds with the presented student assignment; and
executing the remote-save method comprises the studentAssignment model executing the remote-save method.

6. The method of claim 5, wherein receiving the user input comprises a studentResponse model of the plurality of studentResponse models receiving the user input.

7. The method of claim 5, wherein each studentResponse model of the plurality of studentResponse models includes a respective studentResponse-model-specific remote-save method, each of which returns either a studentResponse-model-specific remote-save-success promise or a studentResponse-model-specific remote-save-failure promise.

8. The method of claim 7, wherein the studentAssignment model executing the remote-save method comprises the studentAssignment model:
instructing each studentResponse model of the plurality of studentResponse models to execute its respective studentResponse-model-specific remote-save method;

returning a remote-save-success promise from the remote-save method if every such studentResponse-model-specific remote-save method returns a studentResponse-model-specific remote-save-success promise; and returning a remote-save-failure promise from the remote-save method if at least one such studentResponse-model-specific remote-save method returns a studentResponse-model-specific remote-save-failure promise.

9. The method of claim 8, wherein a given studentResponse model executing its respective studentResponse-model-specific remote-save method comprises the given child studentResponse model:

determining whether a status parameter of the given studentResponse model is in a clean state or a dirty state, wherein the dirty state corresponds to the given child studentResponse model containing updated user input with respect to a previous execution of the remote-save method, wherein the clean state corresponds to the given child studentResponse model not containing such updated user input;

returning a studentResponse-model-specific remote-save-success promise from its respective studentResponse-model-specific remote-save method if the status parameter is in the clean state; and executing an attempt protocol to attempt to save the updated user input to the remote server if the status parameter is in the dirty state, and returning a studentResponse-model-specific remote-save-success promise from its respective studentResponse-model-specific remote-save method if the attempt protocol results in successfully saving the updated student user input to the remote server, and instead returning a studentResponse-model-specific remote-save-failure promise from its respective studentResponse-model-specific remote-save method if the attempt protocol does not result in successfully saving the updated user input to the remote server.

10. The method of claim 9, wherein the status parameter of the given studentResponse model is initially set to the clean state, the method further comprising:

changing the status parameter of the given studentResponse model from the clean state to the dirty state responsive to receiving the user input via the client-side user interface.

11. The method of claim 10, further comprising:
resetting the status parameter of the given studentResponse model to the clean state in connection with returning a studentResponse-model-specific remote-save-success promise from the respective studentResponse-model-specific remote-save method of the given child studentResponse model.

12. The method of claim 9, wherein executing the attempt protocol comprises making multiple attempts to save the updated user input to the remote server.

13. The method of claim 5, wherein the studentAssignment model executing the remote-save method comprises the studentAssignment model:

determining that a subset of the studentResponse models of the plurality of studentResponse models contain updated user input with respect to a previous execution of the remote-save method;

instructing each studentResponse model in the subset to execute its respective studentResponse-model-specific remote-save method;

returning a remote-save-success promise from the remote-save method if every such studentResponse-model-specific remote-save method returns a studentResponse-model-specific remote-save-success promise; and returning a remote-save-failure promise from the remote-save method if at least one such studentResponse-model-specific remote-save method returns a studentResponse-model-specific remote-save-failure promise.

14. The method of claim 13, wherein determining whether a given studentResponse model of the plurality of studentResponse models contains updated user input with respect to a previous execution of the remote-save method comprises determining whether a status parameter of the given studentResponse model is in a clean state or a dirty state, wherein the dirty state corresponds to the given studentResponse model containing updated user input with respect to a previous execution of the remote-save method, wherein the clean state corresponds to the given studentResponse model not containing such updated user input.

15. The method of claim 14, wherein a given studentResponse model executing its respective studentResponse-model-specific remote-save method comprises the given studentResponse model:

executing an attempt protocol to attempt to save the updated user input to the remote server;

returning a studentResponse-model-specific remote-save-success promise from its respective studentResponse-model-specific remote-save method if the attempt protocol results in successfully saving the updated user input to the remote server; and returning a studentResponse-model-specific remote-save-failure promise from its respective studentResponse-model-specific remote-save method if the attempt protocol does not result in successfully saving the updated user input to the remote server.

16. The method of claim 15, wherein the status parameter of the given studentResponse model is initially set to the clean state, the method further comprising:

changing the status parameter of the given studentResponse model from the clean state to the dirty state responsive to receiving the user input via the client-side user interface; and resetting the status parameter of the given studentResponse model to the clean state in connection with returning a studentResponse-model-specific remote-save-success promise from the respective studentResponse-model-specific remote-save method of the given studentResponse model.

17. The method of claim 1, wherein the remote-save method includes a retry protocol.

18. A client-side computing device comprising:
a client-device communication interface;
a client-device user interface;
a client-device processor; and
client-device data storage containing client-device instructions executable by the client-device processor for causing the client-side computing device to carry out a set of functions, wherein the set of functions includes:

presenting a student assignment on a client-side user interface of an educational platform via the client-device user interface by presenting, in a view, data from a studentAssignment model provided by a codebase, the studentAssignment model comprising a plurality of studentResponse models corresponding to respective assessable tasks associated with the presented student assignment; wherein the client-side user interface is operable in a number of different modes including a read/write mode and a read-only mode;

initially operating the client-side user interface in the read/write mode;

receiving user input via the client device user interface, the user input associated with an argument-building-block studentResponse model from the plurality of studentResponse models, the argument-building-block studentResponse model having a status parameter and a responseData element for storing data associated with a set of argument-building-block elements, the data including at least (i) an ordering of the argument-building-block elements, and (ii) text content of the argument-building-block elements received via a corresponding set of argument input fields;

responsive to receiving the user input associated with the argument-building-block studentResponse model, changing the status parameter from a clean state to a dirty state;

detecting a remote-save-triggering event, and responsively executing a remote-save method that attempts, via the client-device communication interface, to save the received user input to a remote server, wherein the remote-save method returns either a remote-save-success promise or a remote-save-failure promise;

continuing to operate the client-side user interface in the read/write mode mode and changing the status parameter from the dirty state to the clean state if the remote-save method returns a remote-save-success promise; and transitioning to operating the client-side user interface in a read-only mode if the remote-save method returns a remote-save-failure promise.

* * * * *